United States Patent
Kadowaki et al.

(10) Patent No.: US 10,264,073 B2
(45) Date of Patent: *Apr. 16, 2019

(54) CLOUD SERVICE UTILIZATION

(71) Applicant: International Business Machines Corporation, Armonk, NY (US)

(72) Inventors: Isao Kadowaki, Yokohama (JP); Yuriko Nishikawa, Tokyo (JP); Munetaka Ohtani, Fujisawa (JP); Masaki Saitoh, Yokohama (JP); Asuka Unno, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/643,713

(22) Filed: Jul. 7, 2017

(65) Prior Publication Data

US 2018/0041580 A1 Feb. 8, 2018

Related U.S. Application Data

(63) Continuation of application No. 15/225,926, filed on Aug. 2, 2016.

(51) Int. Cl.
*H04L 29/08* (2006.01)
*G06F 3/06* (2006.01)

(52) U.S. Cl.
CPC .......... *H04L 67/1097* (2013.01); *G06F 3/061* (2013.01); *G06F 3/067* (2013.01); *G06F 3/0647* (2013.01); *H04L 67/10* (2013.01); *H04L 67/2819* (2013.01)

(58) Field of Classification Search
CPC . H04L 67/1097; H04L 67/10; H04L 67/2819; G06F 3/061; G06F 3/0647; G06F 3/067
See application file for complete search history.

(56) References Cited

U.S. PATENT DOCUMENTS

| | | | | |
|---|---|---|---|---|
| 8,516,137 B2* | 8/2013 | Calder | ................ | G06F 3/0604 709/229 |
| 8,924,511 B2* | 12/2014 | Brand | ................ | H04L 67/1097 709/213 |
| 9,135,116 B1* | 9/2015 | Balasubramanian | ........................ | G06F 11/1435 |
| 9,207,946 B2* | 12/2015 | Davis | ........................ | G06F 9/44 |
| 9,396,228 B2* | 7/2016 | Corbett | ............. | G06F 17/30442 |

(Continued)

FOREIGN PATENT DOCUMENTS

| | | |
|---|---|---|
| JP | 2014078080 A1 | 9/2012 |
| JP | 2014010540 A1 | 1/2014 |
| WO | 20140150299 A1 | 9/2014 |

OTHER PUBLICATIONS

Unknown, "The Promise & Challenges of Cloud Storage", Imex Research, Copyright 2010, San Jose, CA. 8 pages.

(Continued)

*Primary Examiner* — Patrice L Winder
(74) *Attorney, Agent, or Firm* — Jay Wahlquist

(57) ABSTRACT

Cloud services may be utilized by implementing an I/O hook that can intercept a data access from an application, migrating data accessed by the application to a cloud server that provides a cloud service, receiving, from the I/O hook, a data access intercepted from the application, and redirecting the intercepted data access to the cloud server.

18 Claims, 25 Drawing Sheets

(56) References Cited

U.S. PATENT DOCUMENTS

| | | | |
|---|---|---|---|
| 9,749,291 B2* | 8/2017 | Fork | H04L 61/2592 |
| 9,813,353 B1* | 11/2017 | Suit | H04L 47/70 |
| 9,875,029 B2* | 1/2018 | Bromley | G06F 3/0607 |
| 2010/0332401 A1* | 12/2010 | Prahlad | G06F 17/30082 705/80 |
| 2012/0303654 A1 | 11/2012 | Ferris | |
| 2014/0032405 A1* | 1/2014 | Kurabayashi | G06Q 30/02 705/40 |
| 2014/0172406 A1* | 6/2014 | Baset | G06F 11/3409 703/22 |
| 2014/0181436 A1* | 6/2014 | Modzelewski | G06F 11/2087 711/162 |
| 2014/0282539 A1* | 9/2014 | Sonnek | G06F 9/45558 718/1 |
| 2015/0106578 A1* | 4/2015 | Warfield | G06F 3/0613 711/158 |
| 2015/0212898 A1* | 7/2015 | Kleynhans | G06F 11/1469 707/679 |
| 2015/0378921 A1* | 12/2015 | Karippara | G06F 9/45533 710/308 |
| 2015/0381435 A1 | 12/2015 | Todd et al. | |
| 2016/0164962 A1* | 6/2016 | Ghosh | H04L 67/1008 709/223 |
| 2016/0269488 A1* | 9/2016 | Zhao | G06F 17/30 |
| 2016/0283501 A1* | 9/2016 | Konig | G06F 17/3007 |
| 2016/0292040 A1* | 10/2016 | Kumarasamy | G06F 11/1451 |
| 2017/0097775 A1* | 4/2017 | Ben Dayan | G06F 3/0605 |
| 2017/0177895 A1* | 6/2017 | McHale | G06F 21/6218 |
| 2018/0054444 A9* | 2/2018 | Dotan | H04L 63/102 |

OTHER PUBLICATIONS

Unknown, "Powerful Cloud-Based in-Memory Data Grids for Scalable Performance and Data Analysis", ScaleOut Software, Copyright 2012. 2 pages.

Unknown, "Building a Cloud-Enabled File Storage Infrastructure", F5 White Paper, Copyright 2016, F5 Networks, Inc. Seattle, WA. 17 pages.

Unknown, "DLL injection", from Wikipedia, the free encyclopedia. Apr. 20, 2016. Last printed Jul. 1, 2016. https://en.wikipedia.org/wiki/DLL_injection 3 pages.

Unknown, "Dynamic linker", from Wikipedia, the free encyclopedia. Jun. 12, 2016. Last printed Jul. 1, 2016. https://en.wikipedia.org/wiki/Dynamic_linker#ELF-based_Unix-like_sy 4 pages.

Mell, et al., "The NIST Definition of Cloud Computing", Recommendations of the National Institute of Standards and Technology. Special Publication 800-145. Sep. 2011. 7 pages.

Unknown, "NetApp DataMotion Software", NetApp, Copyright 2016. Last printed Jul. 28, 2016. http://www.netapp.com/uk/products/platform-os/datamotion.aspx 2 pages.

Unknown, "Information life cycle management is save the storage crisis", ITmedia Inc., Sep. 15, 2004. Last printed Jul. 28, 2016. https://translate.google.com/translate?sl=ja&tl=en&js=y&prev=_t&hl=en&ie=UTF-8&u=http%3A%2F%2Fwww.atmarkit.co.jp%2Ffsys%2Fkaisetsu%2F046ilm%2Film.html&edit-text=&act=url 7 pages.

Kadowaki et al., "Cloud Service Utilization", U.S. Appl. No. 15/225,926, filed Aug. 2, 2016.

List of IBM Patents or Patent Applications Treated as Related, Jun. 29, 2017. 2 pages.

* cited by examiner

FIG. 23

| | Status | | | | |
|---|---|---|---|---|---|
| I/O agent: | Under execution | Execute | Restart | Stop | |
| Cloud information agent: | Under execution | Execute | Restart | Stop | Cloud constitution ... |
| I/O hook: | Under execution | Execute | Restart | Stop | |
| I/O demon - AAA(OS): | Under execution | Execute | Restart | Stop | |
| I/O demon - BBB1: | Under execution | Execute | Restart | Stop | |
| I/O information collection: | Under execution | Execute | Stop | | File allocation ... |
| Replication: | Done | Execute | Stop | | Cloud update ... |
| Remote I/O: | Under execution | Execute | Stop | | |

OK   Cancel 2300-18

Cloud environment constitution

Cloud environment list:     Add ...   Delete

| Cloud | Type | 1KB (MB/s) | 128KB (MB/s) | 1MB (MB/s) | 10MB (MB/s) | 30 days usability (%) |
|---|---|---|---|---|---|---|
| AAA | Storage | 2.1 | 4.2 | 15.2 | 27.3 | 99.98 |
| AAA | OS | 3.5 | 10.2 | 30.1 | 57.6 | 100 |
| BBB1 | Storage | 1.6 | 2.4 | 9.8 | 15.1 | 99.95 |
| BBB2 | Storage | 2.0 | 3.5 | 12.1 | 20.4 | 99.95 |
| CCC | Storage | 3.1 | 7.6 | 21.4 | 40.5 | 99.99 |
| CCC | OS | 5.5 | 10.3 | 45.7 | 87.4 | 100 |

Selection policy:  ○ Default       ○ Price priority   ○ Speed priority
Type:              ○ Not designated ○ Storage         ○ OS
Usability (%):     100.00
Fee (¥/GB):        50.0

OK   Cancel

File allocation

File allocation list      [Add ...] [Change] [Delete]

| File path | Size | I/O type | Access frequency | Cloud service |
|---|---|---|---|---|
| /log/log201160105.log | 10MB | O | 1200 | BBB1 |
| /opt/appl/data1.txt | 128KB | I | 25 | BBB2 |
| /opt/appl/data2.txt | 256KB | I | 30 | BBB2 |
| /var/aaa.txt | 1MB | I/O | 1234 | AAA (OS) |
| /var/bbb.txt | 2MB | I/O | 5000 | AAA (OS) |
| /var/ccc.txt | 3MB | I/O | 4321 | AAA (OS) |

Rule file: [                    ]

[OK] [Cancel]

Cloud update

List of cloud services presently in use:

| Cloud service | Use amount | Number of files | Annual use fee | Recommended |
|---|---|---|---|---|
| AAA (OS) | 785GB | 30,975 | 329,700 | BBB (OS) |
| BBB1 | 8TB | 501,098 | 768,000 | |
| BBB2 | 4TB | 214,340 | 480,000 | |

Cloud service presently in use: AAA (OS)
    Annual use fee (Yen): 329,700

Recommended cloud service: BBB (OS)    [Details ...]
    Annual use fee (Yen): 235,500

[Update] [Cancel]

FIG. 26

CLOUD SERVICE UTILIZATION

BACKGROUND

There are many computer users that use only on-premise applications as a matter of routine. However, data files used by applications have been increasing from year to year. With the proliferation of cloud services, there is a growing demand for use of applications with a cloud environment (cloud storage) with a low Total Cost of Ownership (TCO).

SUMMARY

According to a first aspect, provided is a method including implementing an I/O hook that can intercept a data access from an application, migrating data accessed by the application to a cloud server that provides a cloud service, receiving, from the I/O hook, a data access intercepted from the application, and redirecting the intercepted data access to the cloud server. The first aspect may enable TCO to be reduced. The first aspect may also include a program for implementing the method, a computer executing the program, and an apparatus that performs the method.

According to a second aspect, the method may further include selecting the cloud service among a plurality of cloud services based on the data access statistics generated by the I/O hook. The second aspect may enable TCO to be reduced by determining, on the basis of statistical information, an optimum allocation from a plurality of cloud storage services.

According to a third aspect, the collecting may include collecting at least part of the information by measuring performance of at least one of the plurality of cloud services. The third aspect may provide an optimum allocation from a plurality of cloud storage services for an application that performs I/O on a multiplicity of data files differing in access frequency and size.

According to a fourth aspect, the selecting may be further based on at least one of a price, a free storage size, a maximum storage size, a performance, an availability, and a security of each cloud storage service. The fourth aspect may enable TCO to be reduced by determining, on the basis of statistical information, an optimum allocation from a plurality of cloud storage services differing in data access speed, capacity and fee.

According to a fifth aspect, provided is a server including a processor, one or more computer readable mediums collectively including instructions that, when executed by the processor, cause the processor to receive an application from a computer across a network, implement an I/O hook that can intercept a data access from the application, migrate data accessed by the application to a cloud server that provides a cloud service, receive, from the I/O hook, a data access intercepted from the application, redirect the intercepted data access to the cloud server, and provide output from the application to the computer. The fifth aspect may enable TCO to be reduced by migrating an applications execution files as well as the applications data files, while still being able to utilize other cloud services.

The above summary is not intended to describe all features of the embodiments and some embodiments may also be a sub-combination of the features described above.

BRIEF DESCRIPTION OF THE DRAWINGS

FIG. 23 shows one embodiment of an example user interface for monitoring the status of utilization of cloud services.

FIG. 24 shows one embodiment of an example user interface for monitoring a cloud environment constitution.

FIG. 25 shows one embodiment of an example user interface for monitoring a file allocation table.

FIG. 26 shows one embodiment of an example user interface for monitoring presently used cloud services.

DESCRIPTION OF EXEMPLARY EMBODIMENTS

While business may desire to increase usage of cloud services, there are some barriers, such as, a business application cannot be paused during its operation for very long. Migration of an entire system into a cloud causes an increase in cost. It can be difficult to determine which cloud service is optimal. As a result, many businesses will give up on utilizing cloud services.

In addition, there is a need for data movement on an application-by-application basis in and out of a plurality of cloud services provided by third parties. There is also a need for dividing and allocating data generated on an application-by-application basis to a plurality of cloud services provided by third parties. Embodiments described herein enables solutions to these needs.

For example, embodiments described herein may divide and allocate data generated on an application-by-application basis to a plurality of cloud storage services provided by the user of the application and/or third parties. Some embodiments perform a process for migrating a file used by an on-premise application into an optimum cloud environment, from the viewpoint of TCO, without disturbing routine functions, and for continuously maintaining the optimum condition. An agent that periodically collects cloud information may select a cloud environment with the lowest price suitable for allocation of the file used by the on-premise application. A daemon may perform communication processing for an agent that performs processing for communication with the plug-in and on the cloud environment. The daemon may perform I/O processing on a plug-in which hooks file I/O processing performed by the on-premise application.

Files that may be divided and allocated to a plurality of cloud storage services are files on which an application performs I/O processing. These files will be referred to hereinafter as "data files" in contrast with the application main body files, which will be referred to hereinafter as "execution files." Data files can be divided into the following three kinds of files in correspondence with different kinds of I/O processing: Read-only files (e.g., configuration files), Update files (e.g., files for the application), and Write-only files (e.g., log files). The term "write-only file" may be used herein to also refer to a "write-out file," an "update file," or an "update-only file." A specific file I/O process, such as a database application, can be incorporated and migrated into a cloud environment by using special-purpose replication and data access functions.

Figure 1:
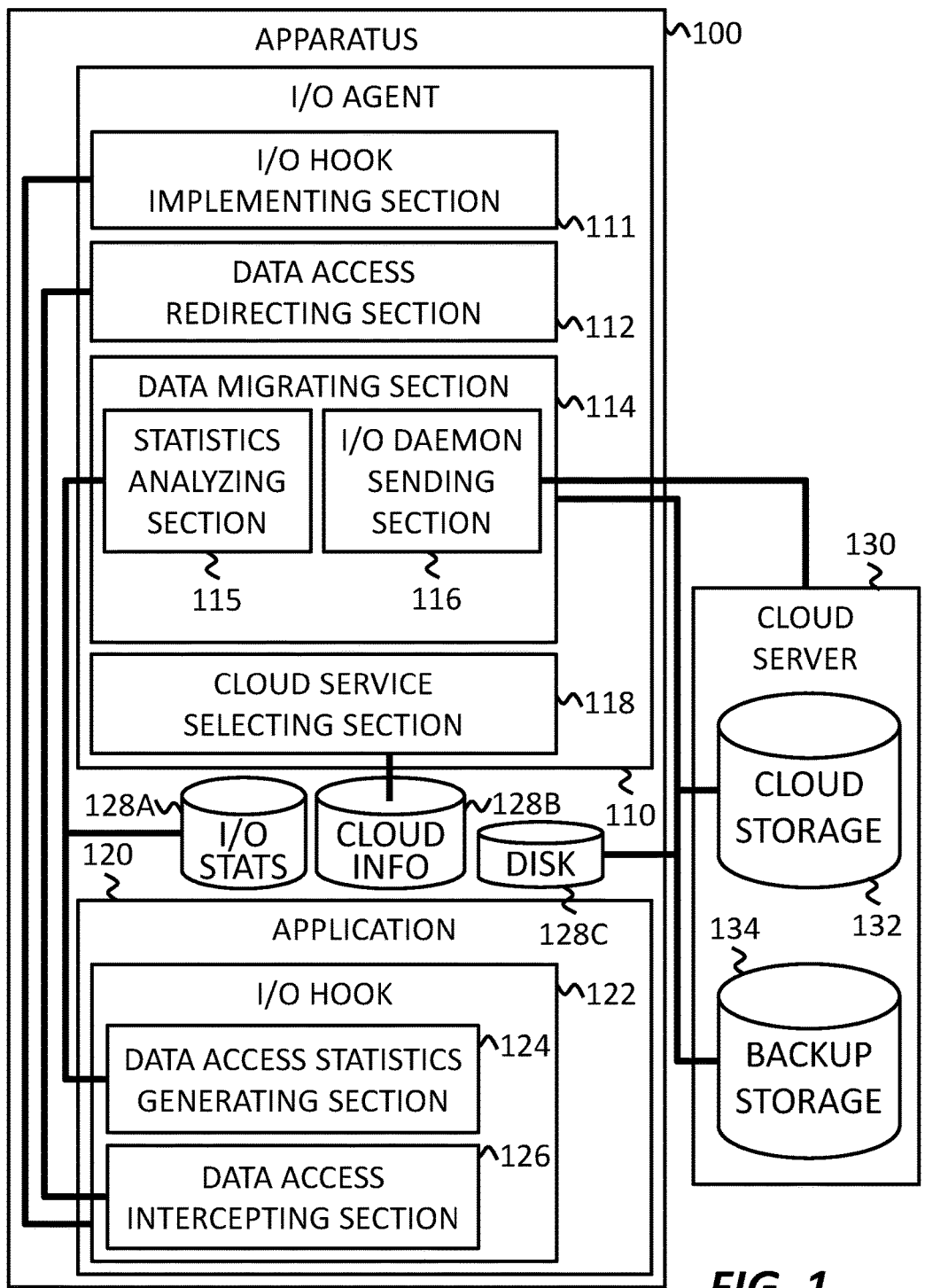
FIG. 1 shows one embodiment of an example apparatus for cloud service utilization.

FIG. 1 shows an apparatus 100 for cloud service utilization. Apparatus 100 may be a host computer such as a server computer or a mainframe computer that executes an on-premise application and hosts client computers that use it. Apparatus 100 may be a computer system that includes two or more computers. Alternatively, apparatus 100 may be a personal computer that executes an application for a user of apparatus 100. Apparatus 100 may utilize cloud services to perform migration of a file used by an on-premise application into a cloud environment, replication of the file, and execution of remote I/O processing on the file required by an on-premise application.

Apparatus 100 may include an I/O agent 110, an application 120, and storage mediums 128A, 128B, and 128C. I/O agent 110 may include an I/O hook implementing section 111, a data access redirecting section 112, a data migrating section 114, which may include a statistics analyzing section 115 and an I/O daemon sending section 116, and a cloud service selecting section 118. Application 120 may include an I/O hook 122, which may include a data access statistics generating section 124 and a data access intercepting section 126. Apparatus 100 may be in communication with a cloud server 130, which may include a cloud storage 132 and a backup storage 134.

I/O agent 110 and application 120 may each be a computer program product comprising a computer readable storage medium having program instructions embodied therewith, the program instructions executable by a computer to cause the computer to perform the operations of the various sections. I/O agent 110 and application 120 may each alternatively be analog or digital programmable circuitry, or any combination thereof. I/O agent 110 and application 120 may each be composed of physically separated storage or circuitry that interacts through communication.

I/O agent 110 may communicate with cloud server 130 or other cloud servers and cloud information agents to select the optimum cloud service for allocating a file used by an on-premise application, such as application 120. I/O agent 110 may communicate with I/O hook 122 and an I/O daemon. I/O agent 110 may totalize I/O processing information transmitted from I/O hook 122, make a request to an I/O daemon for replication according to a requirement from I/O hook 122, and make a request to the I/O daemon for I/O processing according to a requirement from I/O hook 122 and return the result to I/O hook 122. I/O agent 110 may provide a user interface for setting of cloud service selection conditions (fee, performance, usability requirements, etc.), checking and changing a selected cloud service and the place to which a file is allocated, and setting of modes of execution of I/O processing information collection, replication and remote I/O.

I/O hook implementing section 111 may implement I/O hook 122 into application 120 using a technique called Dynamic-Link Library (DLL) injection, which may not change the code of application 120. Data access redirecting section 112 may communicate with data access intercepting section 126 to redirect access to a data file from storage medium 128C to cloud storage 132. Data migrating section 114 may migrate data from disk 128C to cloud storage 132. Data migrating section 114 may migrate data from backup storage 134 to cloud storage 132. Statistics analyzing section 115 may communicate with data access statistics generating section 124 to obtain data access statistics and store them in storage medium 128A. These data access statistics may be used to determine the data files to migrate, a schedule of migration, etc. I/O daemon sending section 116 may send an I/O daemon to cloud server 130, the I/O daemon including instructions that, when executed by cloud server 130, cause cloud server 130 to provide data access on cloud server 130. Cloud service selecting section 118 may collect information from a cloud information agent or any other source of cloud service information to select a cloud service among a plurality of cloud services, based on the characteristics of the optimum cloud service, which may be determined based on the I/O statistics.

Application 120 may be a software program or a portion thereof that may be executed by apparatus 100. Application 120 may generate at least one data file while being executed, and may store the data file in storage medium 128C. An example of application 120 is an Extract, Transform, and Load (ETL) job to save intermediate data in files. Application 120 may include I/O hook 122 as a result of DLL injection.

I/O hook 122 may interrupt I/O processing performed by application 120. I/O hook 122 may obtain information on I/O processing performed by application 120 and transmit the information to I/O agent 110, request replication of a data file generated by application 120 to I/O agent 110, and request file I/O of the data file to the I/O agent. Data access statistics generating section 124 may communicate with statistics analyzing section 115 and storage medium 128A to send I/O processing information, such as information concerning the manner that application 120 is executed and that the data files generated by application 120 are utilized. Data access intercepting section 126 may communicate with data access redirecting section 112 to notify data access redirecting section 112 of the time and data file that application 120 is attempting to access. Data access intercepting section 126 may receive an alternate location of the data file from data access redirecting section 112 that application 120 is attempting to access, and forward the alternate location for the data file to application 120.

In other embodiments, an I/O daemon may be included in either an apparatus or a cloud server in order to perform some of the functions for cloud service utilization. The I/O daemon may communicate with an I/O agent, such as I/O agent 110, to execute replication of a data file according to a request from the I/O agent, execute file I/O processing according to a request from the I/O agent, and return the result to the I/O agent. A cloud storage compatible I/O daemon may execute in an on-premise environment, such as apparatus 100, to perform the above-described processing according to an instruction from the I/O agent by using an I/O processing API provided by a cloud storage service. An Operating System (OS) level file I/O compatible daemon may execute in an OS environment, such as cloud server 130, provided by a cloud to perform the above-described processing according to an instruction from the I/O agent by using a file I/O at OS level while communicating with the I/O agent. In FIG. 1, I/O agent 110 may perform the functions of a cloud storage compatible I/O daemon.

In some embodiments, an I/O agent, such as I/O agent 110, collects I/O processing information transmitted from an I/O hook, such as I/O hook 122, and adds the information to a table, such as TABLE 1 shown below. The I/O processing information collection table may be a stream.

cessing information table, such as TABLE 1, is read. At S240-3, the I/O processing information of the table may be processed to derive a number of data access requests by applications, or "calls," their associated data files, and their associated I/O processing information. At S240-5, the I/O agent may determine the maximum read and write speeds that are required by the apparatus, which may be among all applications executed on the apparatus, and the time that those speeds are required. At S240-7, the I/O agent may obtain allocation indices for a cloud service, such as a service by cloud server 130, suitable for storing the data files and handling the maximum read and write speeds at the required time. At S240-9, the I/O agent may write the data files to the allocation indices of the suitable cloud service. Thereafter, any calls to those data files may be redirected to the cloud service.

In some embodiments, an I/O agent, such as I/O agent 110, may periodically check the number of files newly added to a totalization table, such as TABLE 1, and determines whether or not all read-only data files have been identified.

Figure 3:
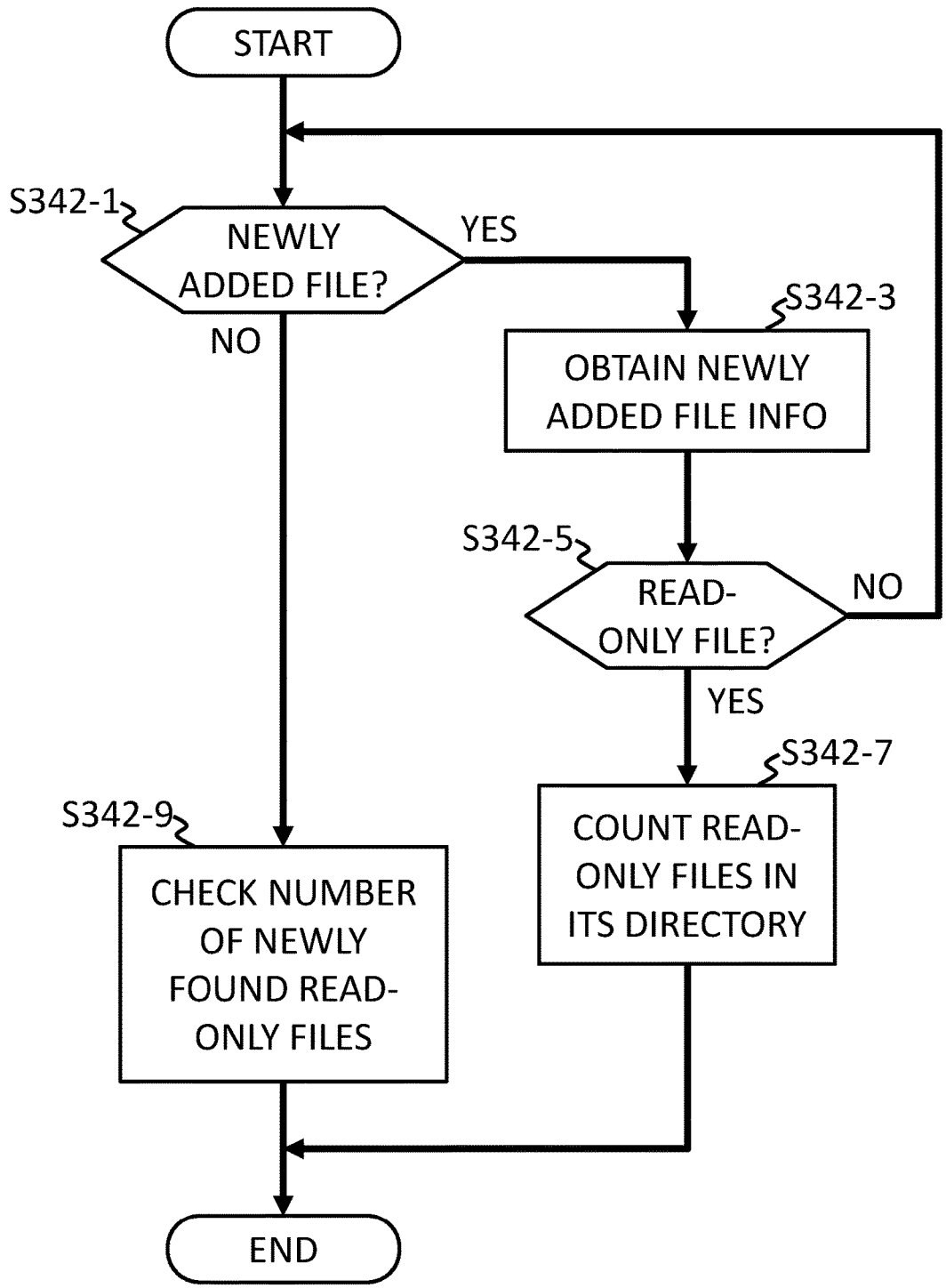
FIG. 3 shows one embodiment of an example operational flow for recognizing newly added read-only data files.

FIG. 3 shows an operational flow for recognizing newly added read-only data files. The operations S342-1-S342-9 may be performed by a statistics analyzing section, such as statistics analyzing section 115, and an I/O daemon sending section, such as I/O daemon sending section 116, of an I/O agent, such as I/O agent 110, of an apparatus, such as apparatus 100. At S342-1, the I/O agent may determine whether a data file has been newly added to an on-premise storage, such as from generation by an application, such as application 120. If a file has been newly added, then information may be obtained for the newly added file at S342-3. At S342-5, the I/O agent may determine whether or not the newly added file is a read-only file. If the newly added file is not a read-only file, then the process returns to S342-1. If the newly added file is a read-only file, then the total number of read-only files in its directory, including the newly added

TABLE 1

| file path | file handle | inode | op name | op type | read size | write size | timestamp | exec time |
|---|---|---|---|---|---|---|---|---|
| /var/abc.txt | | xxx | stat | | | | | |
| /var/abc.txt | 123 | | open | read | | | 12:15:30.0 | 1 |
| | 123 | | read | | 50000 | | 12:15:30.1 | 10 |
| | 123 | | read | | 50000 | | 12:15:30.2 | 10 |
| | 123 | | close | | | | 12:15:30.3 | 1 |
| /tmp/xyz.txt | 456 | | open | write | | | 12:15:31.0 | 1 |
| | 456 | | write | | | 10000 | 12:15:31.1 | 20 |
| | 456 | | write | | | 10000 | 12:15:31.3 | 20 |
| | 456 | | write | | | | 12:15:31.5 | 1 |
| ... | ... | ... | ... | ... | ... | ... | ... | ... |

The I/O agent may perform totalization processing on any collected I/O processing information to statistical information such as the number of times a data access has been performed, a total read/write size among all data files accessed by applications, an average read/write size, and a peak read/write speed. The I/O agent may obtain values for a read speed priority, a read file size priority, a write speed priority, and a write file size priority as indices for determining which cloud service to allocate a file.

Figure 2:
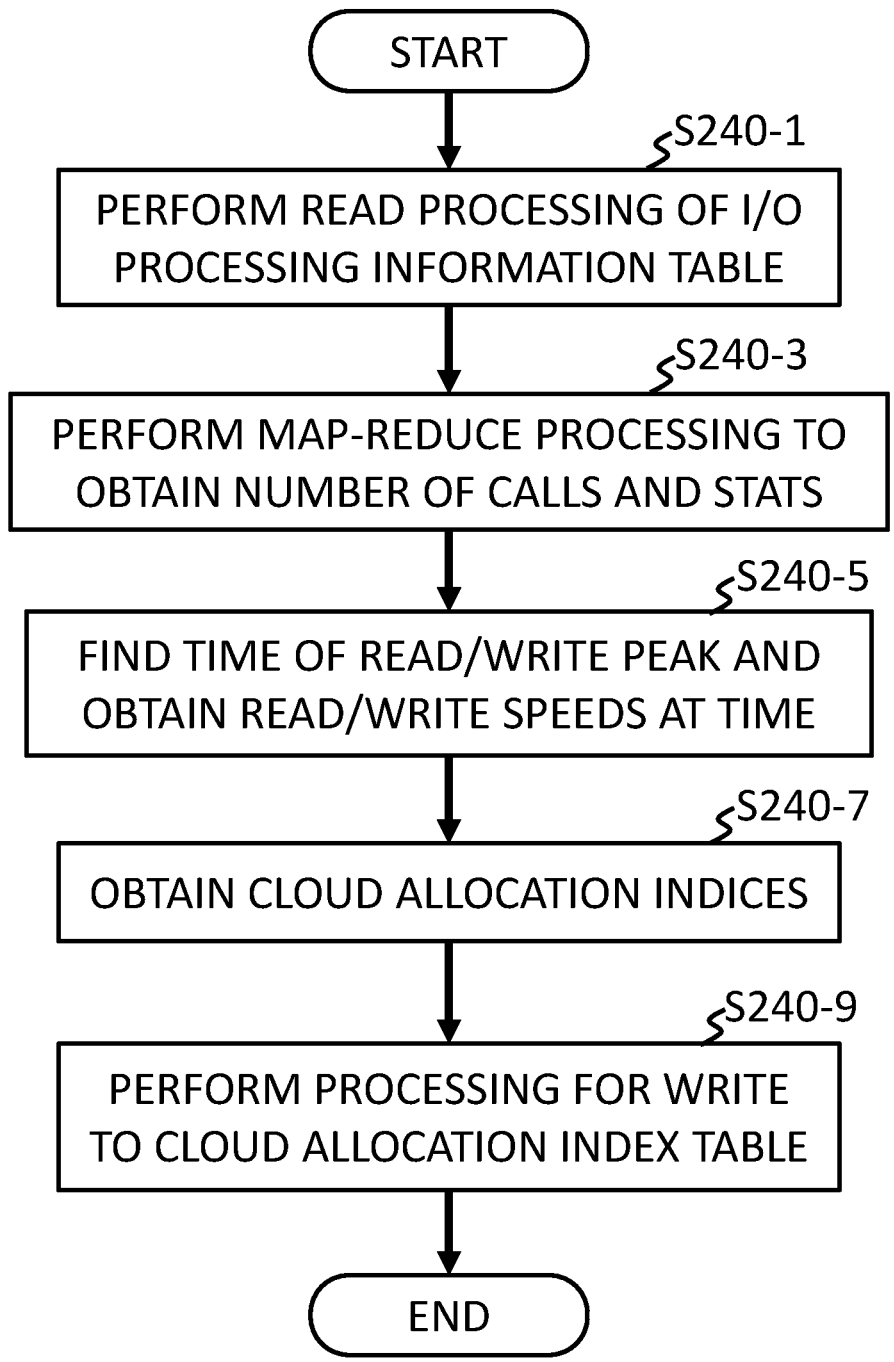
FIG. 2 shows one embodiment of an example operational flow for totalization processing on collected I/O processing information.

FIG. 2 shows an operational flow for totalization processing on collected I/O processing information. The operations S240-1-S240-9 may be performed by a statistics analyzing section, such as statistics analyzing section 115, and an I/O daemon sending section, such as I/O daemon sending section 116, of an I/O agent, such as I/O agent 110, of an apparatus, such as apparatus 100. At S240-1, an I/O proread-only file, may be counted at S342-7. If the I/O agent determines that no new files have been added at S342-1, then the I/O agent may verify the number of newly found read-only files.

In further embodiments, an I/O agent, such as I/O agent 110, may identify update files and write-only files, such as log files having a high probability of being placed with others of the same kind in one directory, before handling an I/O processing request. The I/O agent may designate files whose locations are designated with a rule file for migration, before handling an I/O processing request.

Figure 4:
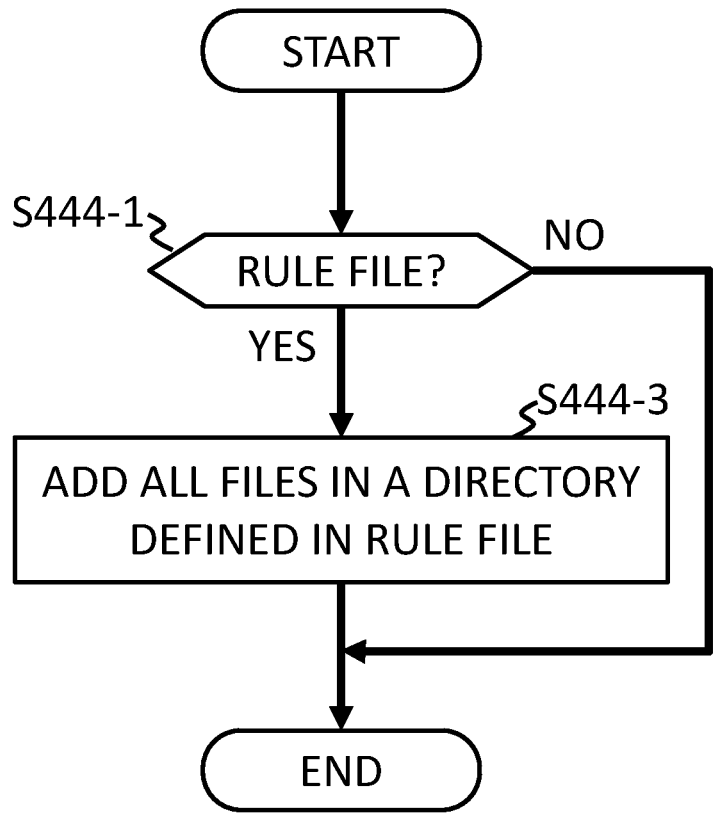
FIG. 4 shows one embodiment of an example operational flow for designating all files in a directory for migration according to a rule file.

FIG. 4 shows an operational flow for designating all files in a directory for migration according to a rule file. The operations S444-1-S444-3 may be performed by a data migrating section, such as data migrating section 114, of an I/O agent, such as I/O agent 110, of an apparatus, such as apparatus 100. At S444-1, the I/O agent may determine whether a rule file exists for the apparatus. The rule file may include paths of directories in a storage medium of the apparatus for which it has been determined that it may be more efficient to simply migrate all of the files within the directory rather than determine whether to migrate each file on an individual basis. If a rule file does exist for the apparatus, then the I/O agent designates all of the files in each directory in the rule file for migration at S444-3. If a rule file does not exist, then the I/O agent will not designate any entire directories for migration, but may still determine whether to migrate any files on an individual basis.

In some embodiments, an I/O hook may collect information by hooking file I/O processing performed by an on-premise application in order to identify a data file in the application. In some embodiments, almost every file used in an ordinary operation can be identified by performing this information collection, for example, for one month. However, in some embodiments, if the internal logic of the application is known, it may not be possible to conclude that all the data files have been identified, even when the information collection period is extended.

On the other hand, when the information collection progresses to such an extent that the number of data files newly found converges to be equal to or smaller than a threshold value, it is possible to determine that a practical operation level of the application has been reached.

In a case where the source code of the objective application is given and the code path at the time of execution can be monitored, concurrent measurement of the code path capture rate during collection of file I/O processing information can help the prevention of data file identification omissions.

A write-only file, such as a log file, or an update file, such as a work file, is ordinarily placed with others in the same directory. Therefore, such files are collectively identified as data files if they meet certain criteria, thereby enabling collection of data files to be completed earlier, more efficiently, and collection omissions to be prevented.

Data files, the number of which is equal to or larger than the threshold value, is collected just under the same directory. If collected data files have the same file prefix or file extension, then those files having such a common file identifier (e.g., logs¥messages*.log) are identified as data files. If the collected data files have different file prefixes or file extensions, then all the files in the directory are identified as data files. If the user knows the locations of data files in advance, then a user interface capable of setting a path list, such as in a rule file, including wild cards for identifying the data files, may be provided, thereby reliably enabling prevention of data file collection omissions.

Figure 5:
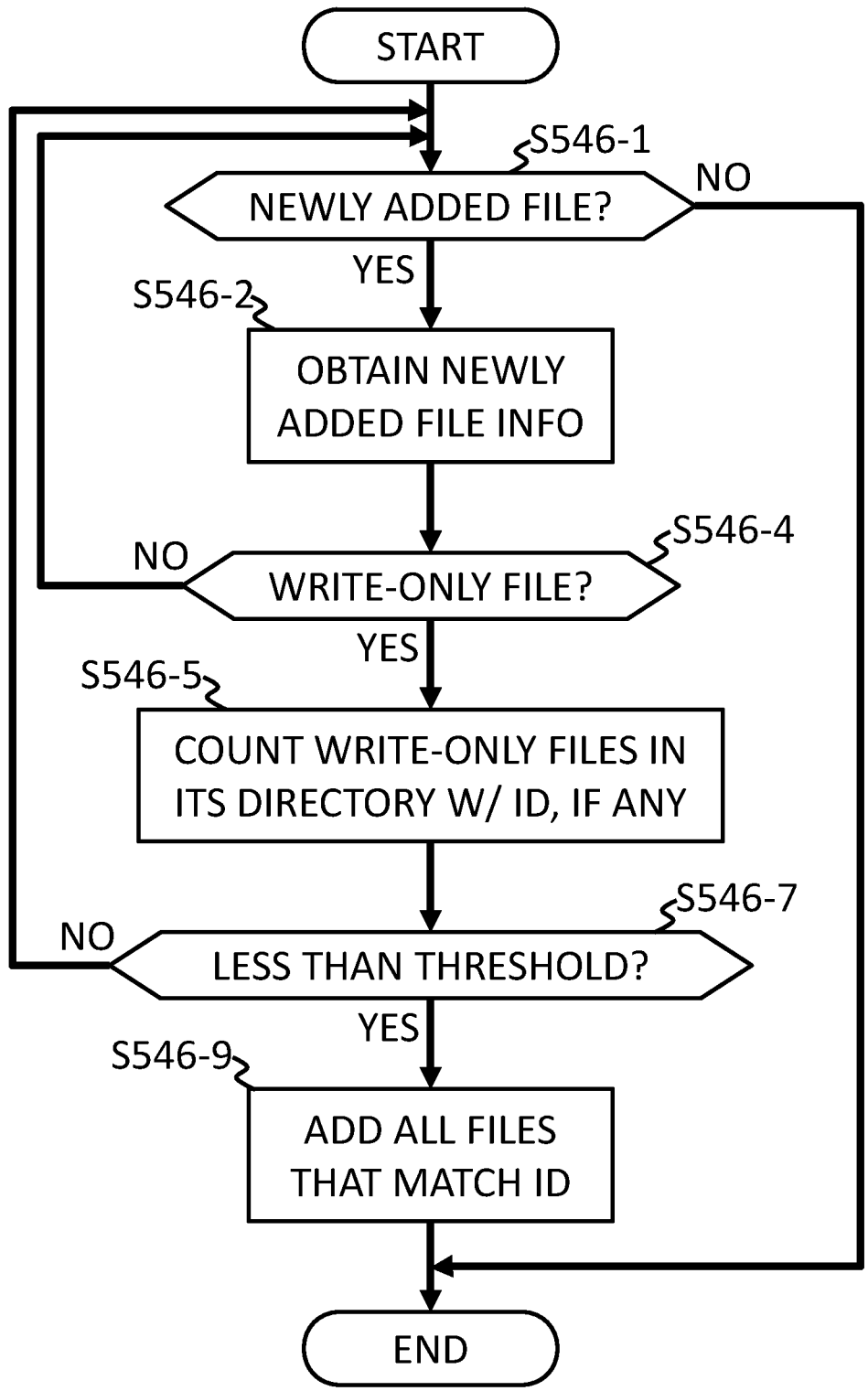
FIG. 5 shows one embodiment of an example operational flow for designating all files in a directory having many write-only files for migration.

FIG. 5 shows an operational flow for designating all files in a directory having many write-only files for migration. The operations S546-1 S546-9 may be performed by a data migrating section, such as data migrating section 114, of an I/O agent, such as I/O agent 110, of an apparatus, such as apparatus 100. At S546-1, the I/O agent may determine whether a data file has been newly added to an on-premise storage of the apparatus, such as from generation by an application, such as application 120. If a file has been newly added, then information may be obtained for the newly added file at S546-2. At S546-4, the I/O agent may determine whether or not the newly added file is a write-only file. If the newly added file is not a write-only file, then the process returns to S546-1. If the newly added file is a write-only file, then the total number of write-only files in its directory, including the newly added write-only file, that match an identification, if any exists, with the newly added write-only file may be counted at S546-5. At S546-7, the I/O agent may determine whether the total number of write-only files matching that identification, if any exists, in that directory is less than a threshold number, or threshold percentage of the total number of files in the directory. If the threshold is not exceeded, then the process returns to S546-1. If the threshold is exceeded, then all of the write-only files in that directory that match the pattern may be added to a list of files designated for migration at S546-9. If the I/O agent determines that no new files have been added at S546-1, then the I/O agent may end the process.

Figure 6:
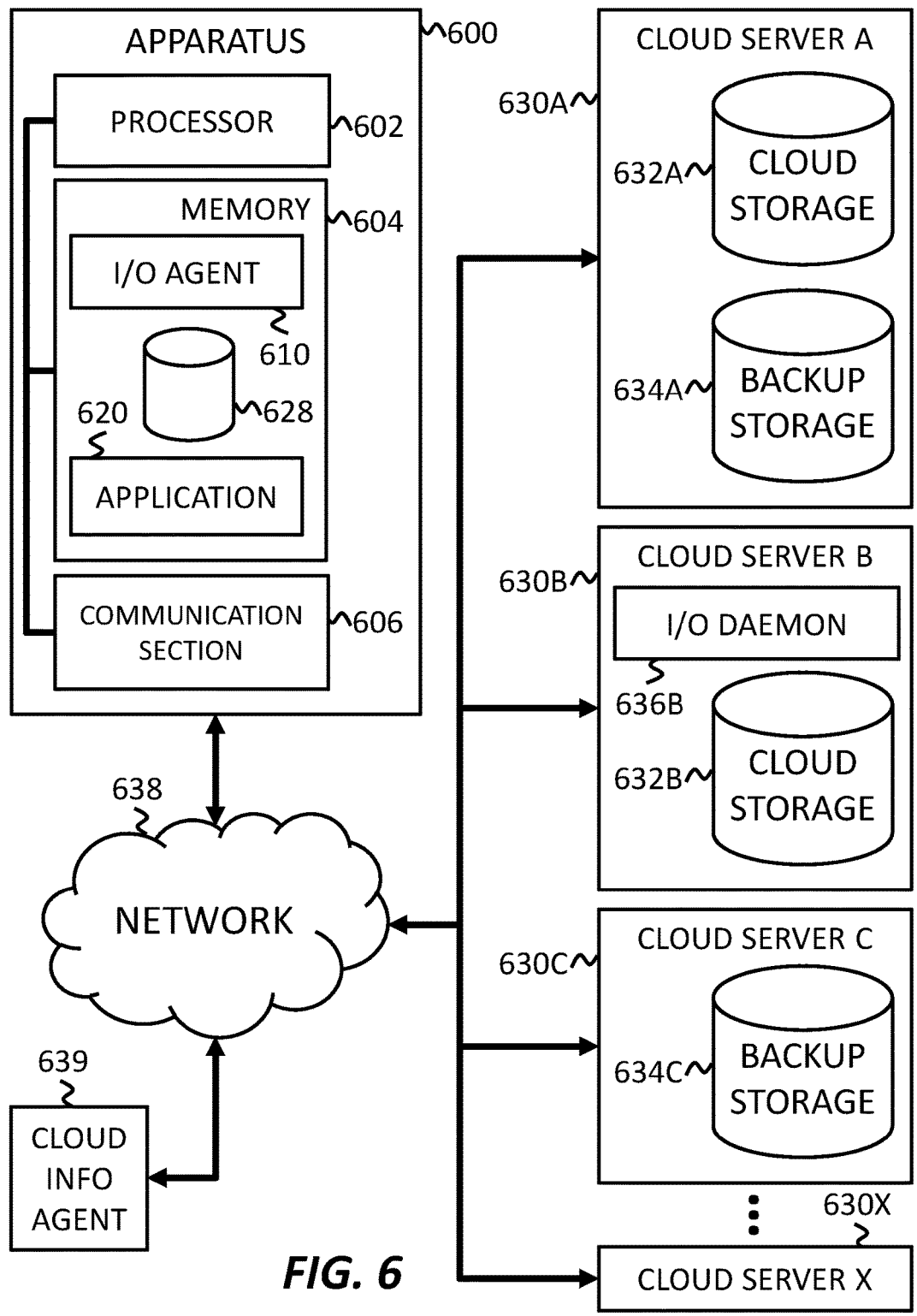
FIG. 6 shows one embodiment of an example system for cloud service utilization.

FIG. 6 shows a system for cloud service utilization. The system may include an apparatus 600, a plurality of cloud servers 630A, 630B, 630C, and 630X, a network 638, and a cloud information agent 639. Apparatus 600 may include a processor 602, one or more computer readable mediums, such as memory 604, collectively including an I/O agent 610, an application 620, and stored data 628, and a communication section 606.

Processor 602 may execute instructions, such as the instructions of I/O agent 610 and application 620, and may send and receive data through communication section 606. When I/O agent 610 is executed by processor 602, processor 602 may utilize cloud services for data files generated by application 620. Processor 602 may be a computer processor, a microprocessor, a digital signal processor, a controller, a microcontroller, etc.

Memory 604 may store information, such as I/O agent 610, application 620, stored data 628, etc., and may make such information available to processor 602 for retrieval. Memory 604 may be any computer-readable medium, such as an electronic storage medium, a magnetic storage medium, an optical storage medium, an electromagnetic storage medium, a semiconductor storage medium, etc., or more specifically a hard disk, a random access memory (RAM), a read-only memory (ROM), an erasable programmable read-only memory (EPROM or Flash memory), electrically erasable programmable read-only memory (EEPROM), a static random access memory (SRAM), a memory stick, an integrated circuit card, etc.

Communication section 606 may send and receive data through any wired or wireless communication protocol to communicate with other devices, networks, etc., such as network 638, cloud information agent 639, and cloud servers 630A, 630B, 630C, and 630X. Communication section 606 may be a cellular transceiver, a Wi-Fi transceiver, a BLUETOOTH® transceiver, etc.

Cloud servers 630A, 630B, 630C, and 630X may store and/or facilitate storage of data, such as data files generated by application 620. Cloud server 630A may include a cloud storage 632A, and a backup storage 634A, each of which may store data, such as data files generated by application 620. Cloud server 630A may store data for on-demand access in cloud storage 632A, and data for long-term storage in backup storage 634A. Cloud server 630B may include a cloud storage 632B and an I/O daemon 636B. Cloud server 630B may store data for on-demand access in cloud storage 632B, and may provide OS level capability by allowing I/O agent 610 to utilize I/O daemon 636B for remote I/O processing. Cloud server 630C may only include a backup storage 634C for long-term storage. Cloud server 630X represents additional possibilities/configurations of types of cloud servers.

Network 638 may establish communication among terminals, such as apparatus 600, cloud servers 630A, 630B, 630C, and 630X, cloud information agent 639, etc. Network 638 may be any local or wide-area network, such as the Internet, and may encompass various relays between terminals utilizing different forms of communication, such as wired or wireless, such as cellular protocols, Wi-Fi, etc.

Cloud information agent 639 may include a list and a fee table of registered cloud services, such as services provided by cloud servers 630A, 630B, 630C, and 630X. Cloud information agent 639 may periodically collect cloud information and select a cloud service with the lowest price, which satisfies conditions required when I/O agent 610 allocates a data file used by an on-premise application, such as application 620. When a file is newly allocated, a cloud service having optimal specifications may be selected. If there is any merit in migrating an already migrated file to a different cloud service, then a user of apparatus 600 may be notified. Cloud information agent 639 may utilize many methods for collecting cloud information. Cloud information agent 639 may automatically collect cloud information by using a web service. Cloud information agent 639 may receive manually input cloud information. Cloud information agent 639 may obtain cloud information from a third party institution that collects, compares, and provides cloud information of cloud services provided by different cloud servers, or may obtain cloud information directly from each cloud server. Cloud information agent 639 may collect cloud information by individually executing a performance measurement tool for each cloud service. Depending on the application and/or the data file, many specifications may be required of the cloud service(s), such as performance (transfer speed, response time, etc.), usability, security, backup, etc.

While many embodiments utilize cloud storage for data files generated by applications, the execution files of an application may also be migrated to cloud storage.

Figure 7:
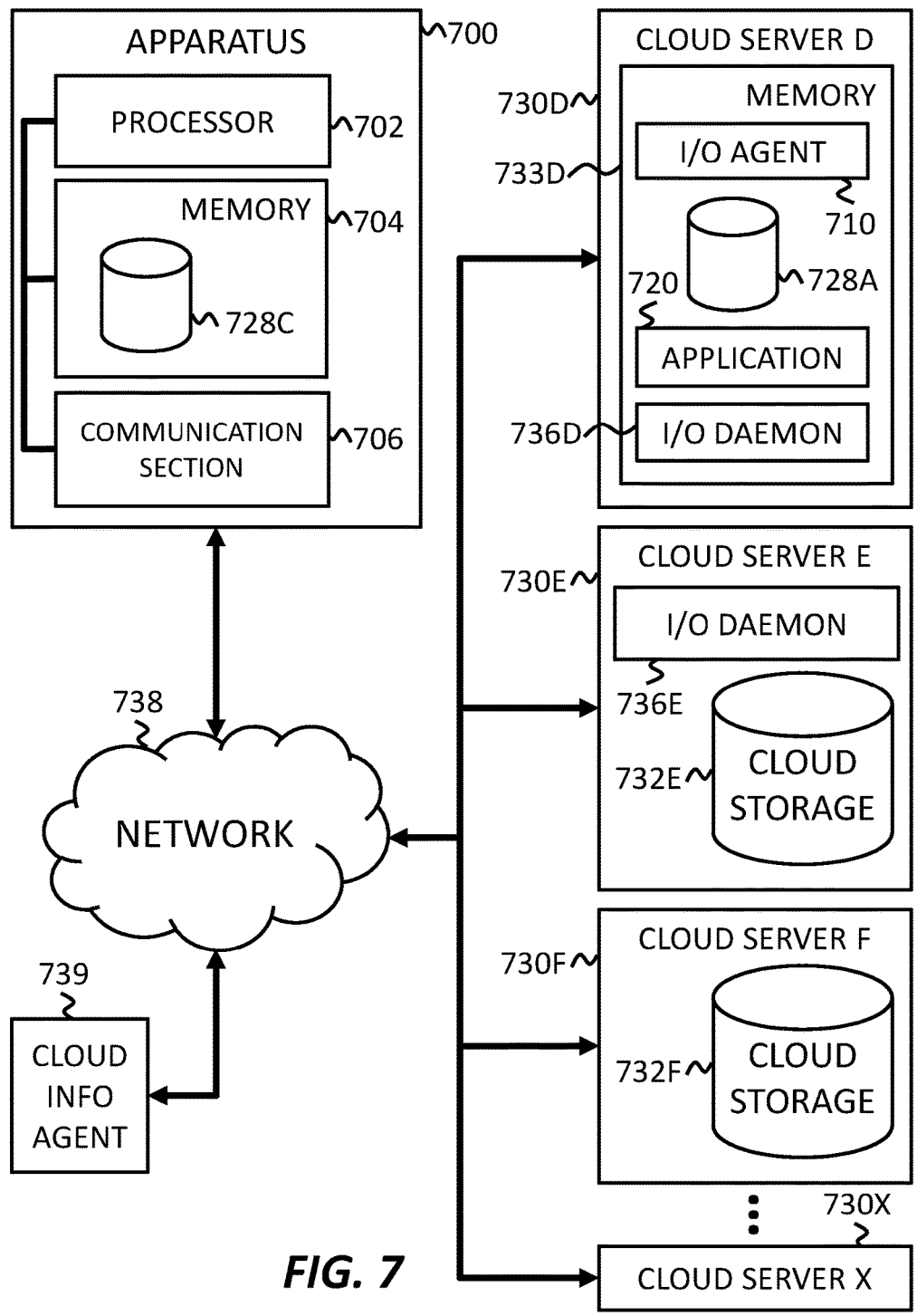
FIG. 7 shows another embodiment of an example system for cloud service utilization.

FIG. 7 shows a system for cloud service utilization. The system may include an apparatus 700, a cloud server 730D, a network 738, and a cloud information agent 739. Apparatus 700 may include a processor 702, one or more computer readable mediums, such as memory 704, collectively including stored data 728C, and a communication section 706. The descriptions of the structures and functions of processor 602, memory 604, communication section 606, network 638, and cloud information agent 639, as described above with respect to FIG. 6, may be applicable to processor 702, memory 704, communication section 706, network 738, and cloud information agent 739, respectively.

Cloud server 730D may include a memory 733D, which may include an I/O agent 710, an application 720, an I/O daemon 736D, and stored data 728A. The descriptions of the structures and functions of memory 604, I/O agent 610, application 620, and I/O daemon 636B, as described above with respect to FIG. 6, may be applicable to memory 733D, I/O agent 710, application 720, and I/O daemon 736D, respectively. However, since I/O agent 710 and application 720 are stored on cloud server 730D instead of apparatus 700, I/O agent 710 may additionally receive input from and provide output to apparatus 700, which may still provide a user interface. I/O agent 710 may work together with I/O daemon 736D to utilize cloud services provided by cloud server 730E and cloud server 730F. Cloud server 730E may include a cloud storage 732E and an I/O daemon 736E. Cloud server 730E may store data for on-demand access in cloud storage 732E, and may provide OS level capability by allowing I/O agent 710 and/or I/O daemon 736D to utilize I/O daemon 732E for remote I/O processing. Cloud server 730F may include a cloud storage 732F, which may store data, such as data files generated by application 720. Cloud server 730F may store data for on-demand access in cloud storage 732F. Cloud server 730X represents additional possibilities/configurations of types of cloud servers.

Figure 8:
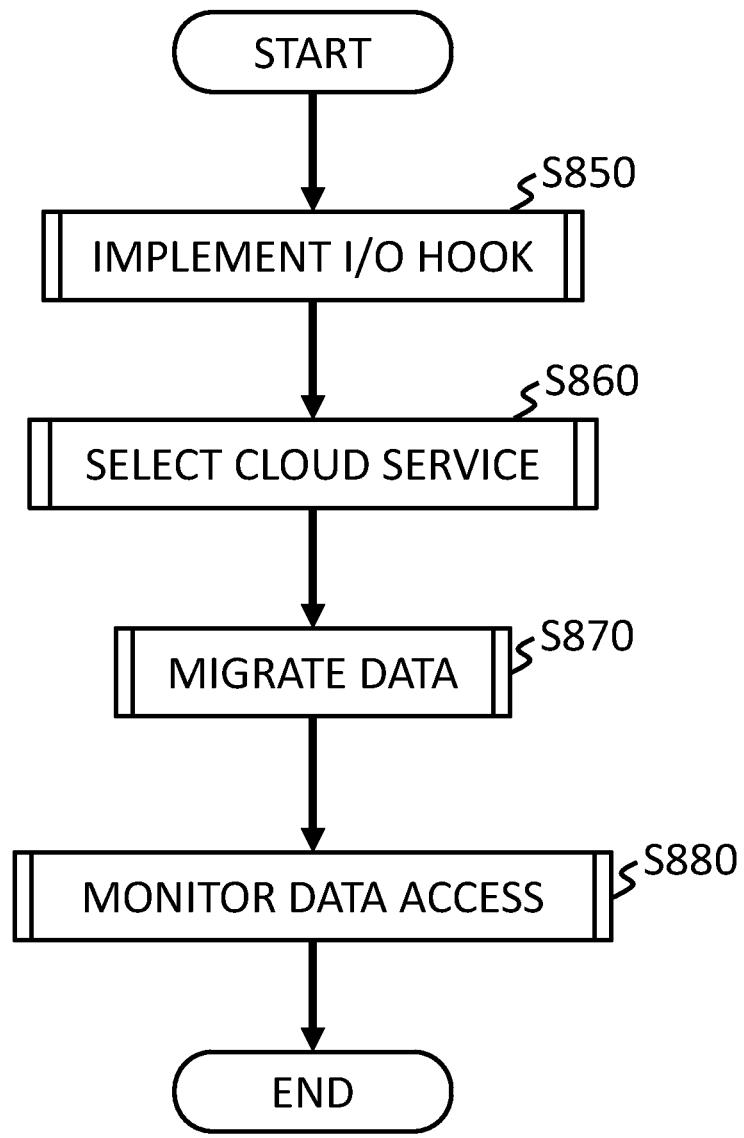
FIG. 8 shows one embodiment of an example operational flow of cloud service utilization.

FIG. 8 shows an operational flow of cloud service utilization. The operations S850-S880 may be performed by an I/O agent, such as I/O agent 110, of an apparatus, such as apparatus 100. At S850, an I/O hook implementing section, such as I/O hook implementing section 111, may implement an I/O hook that can intercept a data access from an application. The I/O hook implementing section may employ a technique known as DLL injection, to add the I/O hook to an application, such as application 120, without changing the application. At S860, a cloud selecting section, such as cloud selecting section 118, may select a cloud service from among a plurality of cloud services based on data access statistics generated by the I/O hook. The selection may include collecting information relating to the plurality of storage services, and may be further based on the collected information. Once the I/O hook has been implemented in the application, the I/O hook may begin monitoring the application's generation of and interaction with data files. As the I/O hook monitors this activity, the I/O hook may send information of calls, read times, write times, and other data for statistical analysis, as described with respect to FIG. 2. From the statistical analysis, an optimal cloud service may be selected. At S870, a data migration section, such as data migration section 114, may migrate the data accessed by the application to the cloud server that provides the optimal cloud service. Once the optimal cloud service has been selected, the data migration section may send data, such as data files generated by the application, and in some cases the execution files of the application, to the cloud server. At S880, the data access of the application is monitored in order to intercept calls, designate files for migration, switch files from one cloud service to another, and/or send files to backup storage.

As described above, the I/O hook can be implemented by using an existing technique called DLL injection without changing the code of a caller application. For example, in the case of implementation on a Unix platform, the I/O hook can be implemented by designating an I/O hook module for LD_PRELOAD environment variable.

Figure 9:
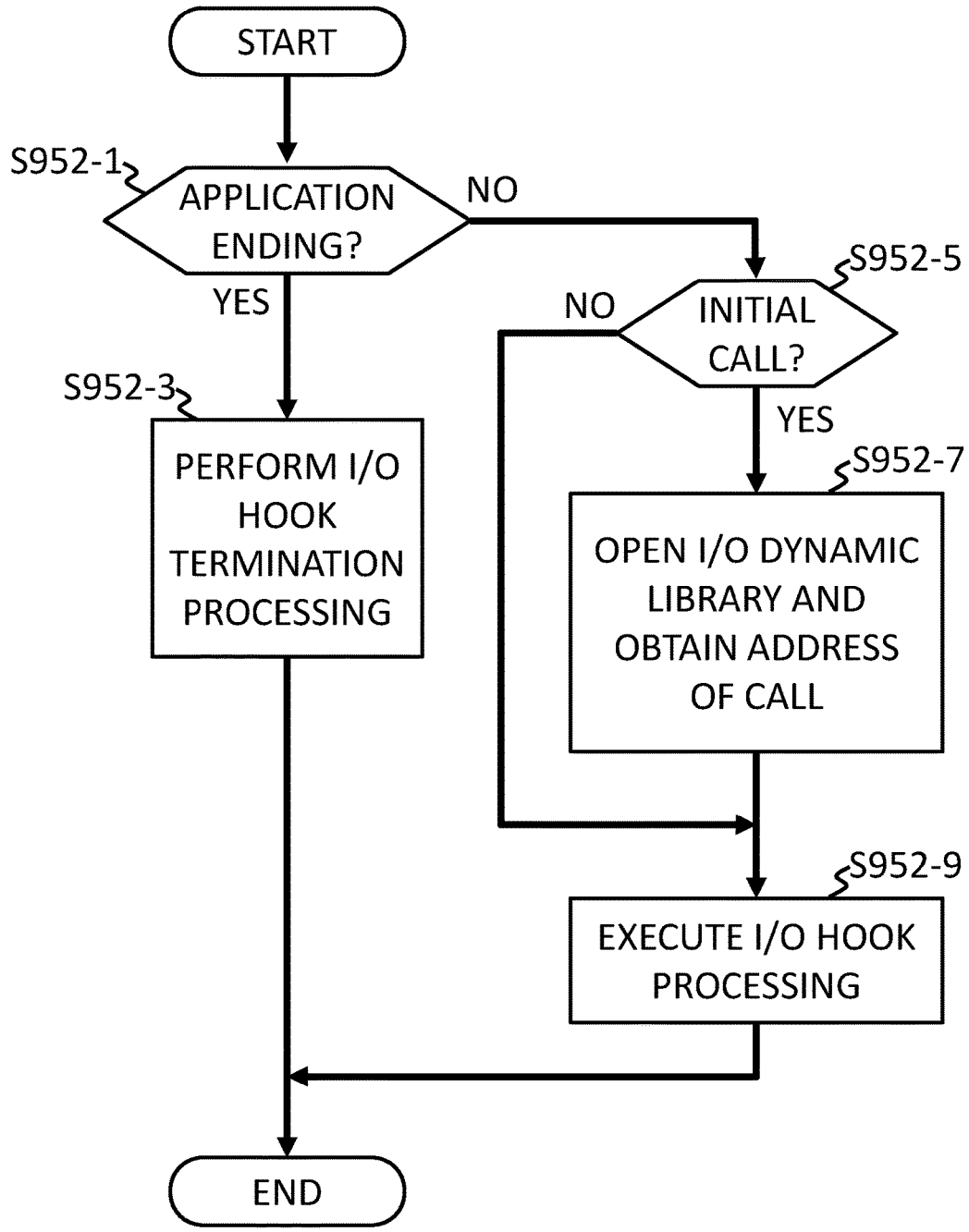
FIG. 9 shows one embodiment of an example operational flow of I/O hook implementation.

FIG. 9 shows an operational flow of I/O hook implementation, such as I/O hook implementation S850. The operations S952-1-S952-9 may be performed by an I/O hook implementing section, such as I/O hook implementing section 111. At S952-1, the I/O hook implementing section may determine whether an application, such as application 120, is ending. If the application is ending, then the I/O hook implementing section may perform I/O hook termination processing, which may cease execution of or erase an I/O hook, such as I/O hook 122, from the application at S952-3. If the application is not ending, then the I/O hook implementing section may wait for the application to make a call for a data file at S952-5. If the application makes an initial call, then the I/O hook implementing section may open an I/O dynamic library and obtain the address of the data file sought by the call of the application at S952-7. Once the address has been obtained, or in the event that no initial call was made by the application at S952-5, the I/O hook implementing section may execute I/O hook processing at S952-9.

In some embodiments, an I/O hook may collect information on an I/O processing or "call" performed by an application, such as an operation name (op_name), e.g., open, close, read, write or stat, an operation type (op_type), e.g., read or write, a file path name (file_path), a file size (file_size), a file access right (file_mode), a read size (read_size), a write size (write_size), a timestamp (timestamp), an execution time (exec_time), etc., and transmit the information to an I/O agent.

Figure 10:
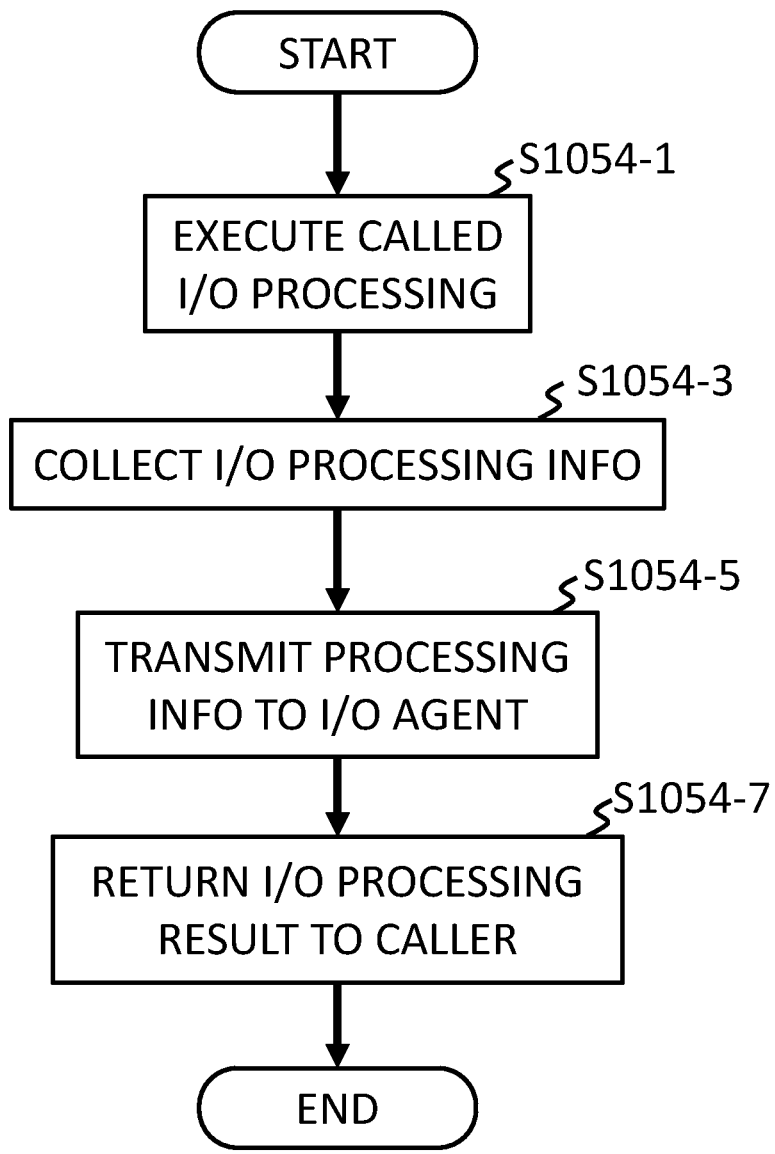
FIG. 10 shows one embodiment of an example operational flow of I/O processing information collection.

FIG. 10 shows an operational flow of I/O processing information collection. The operations S1054-1-S1054-7 may be performed by an I/O hook, such as I/O hook 122. At S1054-1, an I/O processing, or call, of an application, such as application 120, may be executed. At S1054-3, the I/O hook may collect information on the I/O processing, such as operation name, operation type, file path name, file size, file access right, read size, write size, timestamp, execution time, etc. At S1054-5, the I/O hook may transmit the collected information to an I/O agent, such as I/O agent 110. More specifically, a data access statistics generating section, such as data access statistics generating section 124, of the I/O hook may transmit the collected information to a statistics analyzing section, such as statistics analyzing section 115, of a data migrating section, such as data migrating section 114, of the I/O agent. At S1054-7, the I/O hook may return a result of the I/O processing to the application. This result may include an alternate address of the data file sought by the I/O processing, such as an allocation index of a cloud server providing a selected cloud service that stores the data file. The result may be sent to the I/O hook from the I/O agent.

When replication of data is executed, in some embodiments, an I/O hook may make a request to an I/O agent for replication. The information transmitted to the I/O agent for a replication request may be substantially the same as or at least a part of the information transmitted during information collection. Replication may be performed synchronously, in which replication is executed on demand, or asynchronously, in which replication is executed asynchronously, such as according to a schedule at a later time.

Figure 11:
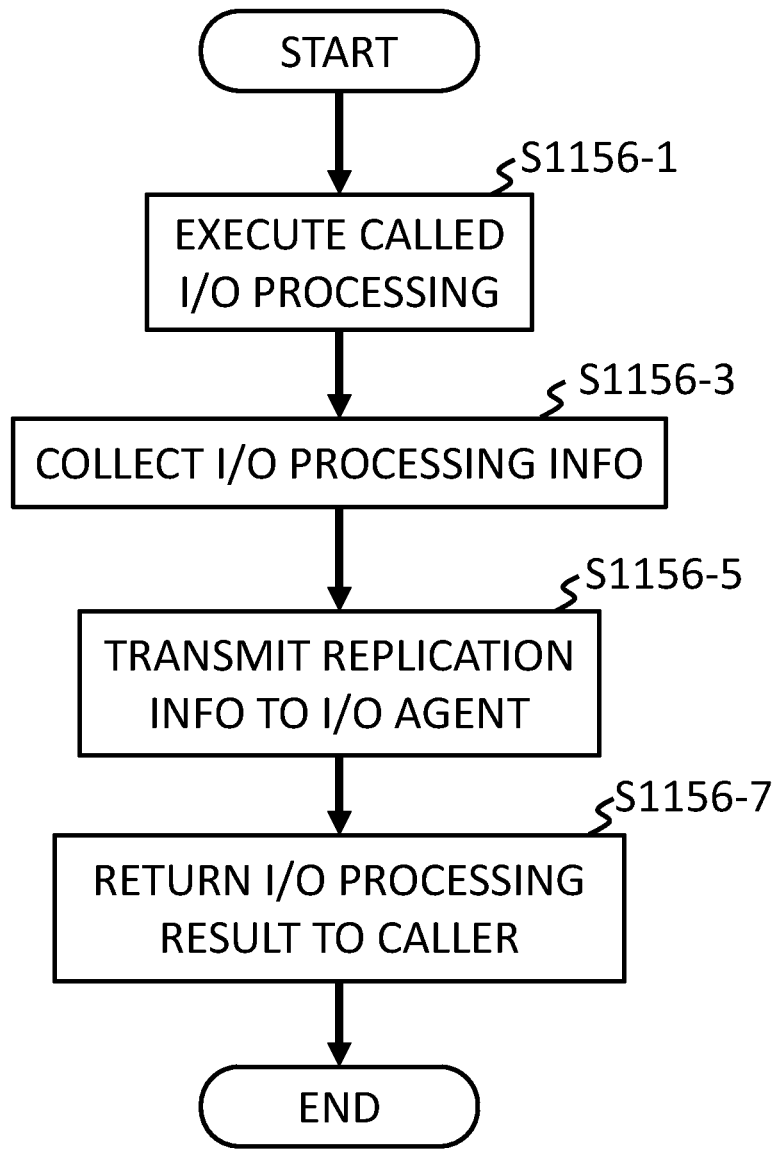
FIG. 11 shows one embodiment of an example operational flow of data replication.

FIG. 11 shows an operational flow of data replication. The operations S1156-1-S1156-7 may be performed by an I/O hook, such as I/O hook 122. At S1156-1, an I/O processing, or call, of an application, such as application 120, may be executed. At S1156-3, the I/O hook may collect replication information on the I/O processing, such as operation name, operation type, file path name, file size, file access right, read size, write size, timestamp, execution time, etc. At S1156-5, the I/O hook may transmit the collected replication information to an I/O agent, such as I/O agent 110. More specifically, a data access intercepting section, such as data access intercepting section 126, of the I/O hook may transmit the collected replication information to a data access redirecting section, such as data access redirecting section 115, of the I/O agent. At S1156-7, the I/O hook may return a result of the I/O processing to the application. This result may include an alternate address of the data file sought by the I/O processing, such as an allocation index of a cloud server providing a selected cloud service that stores the data file, a local address, or read data from the data file. The result may be sent to the I/O hook from the I/O agent.

When remote I/O is to be executed, in some embodiments, the I/O hook may make a request to the I/O agent for file I/O. Information transmitted to the I/O agent for a remote I/O request may be substantially the same as or at least a part of the information transmitted during information collection. The I/O hook may return the I/O processing result to the caller on the basis of information returned from the I/O agent.

Figure 12:
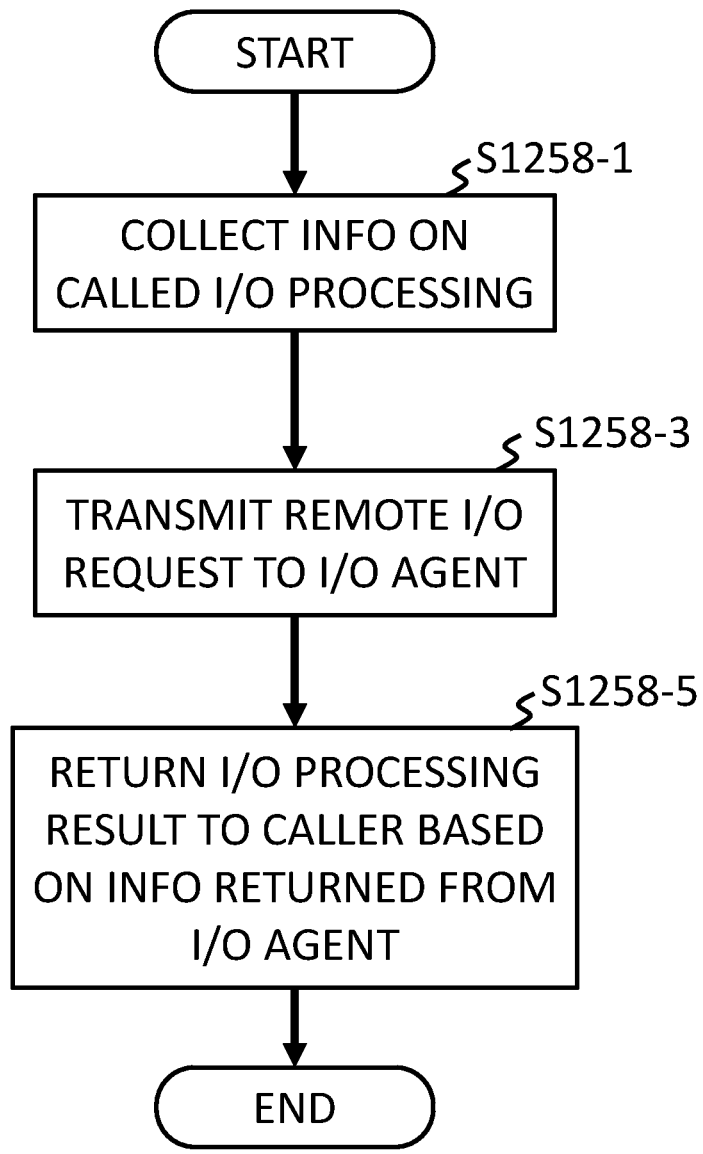
FIG. 12 shows one embodiment of an example operational flow of data replication.

FIG. 12 shows an operational flow of data replication. The operations S1258-1 S1258-5 may be performed by an I/O hook, such as I/O hook 122. At S1258-1, an I/O processing, or call, of an application, such as application 120, may be executed. At S1258-3, the I/O hook may transmit the remote I/O request to an I/O agent, such as I/O agent 110. More specifically, a data access intercepting section, such as data access intercepting section 126, of the I/O hook may transmit the I/O request to a data access redirecting section, such as data access redirecting section 115, of the I/O agent. At S1258-5, the I/O hook may return a result of the I/O processing to the application. This result may include an alternate address of the data file sought by the I/O processing, such as an allocation index of a cloud server providing a selected cloud service that stores the data file, a local address, read data from the data file, a confirmation of written data to the data file, etc. The result may be sent to the I/O hook from the I/O agent.

Figure 13:
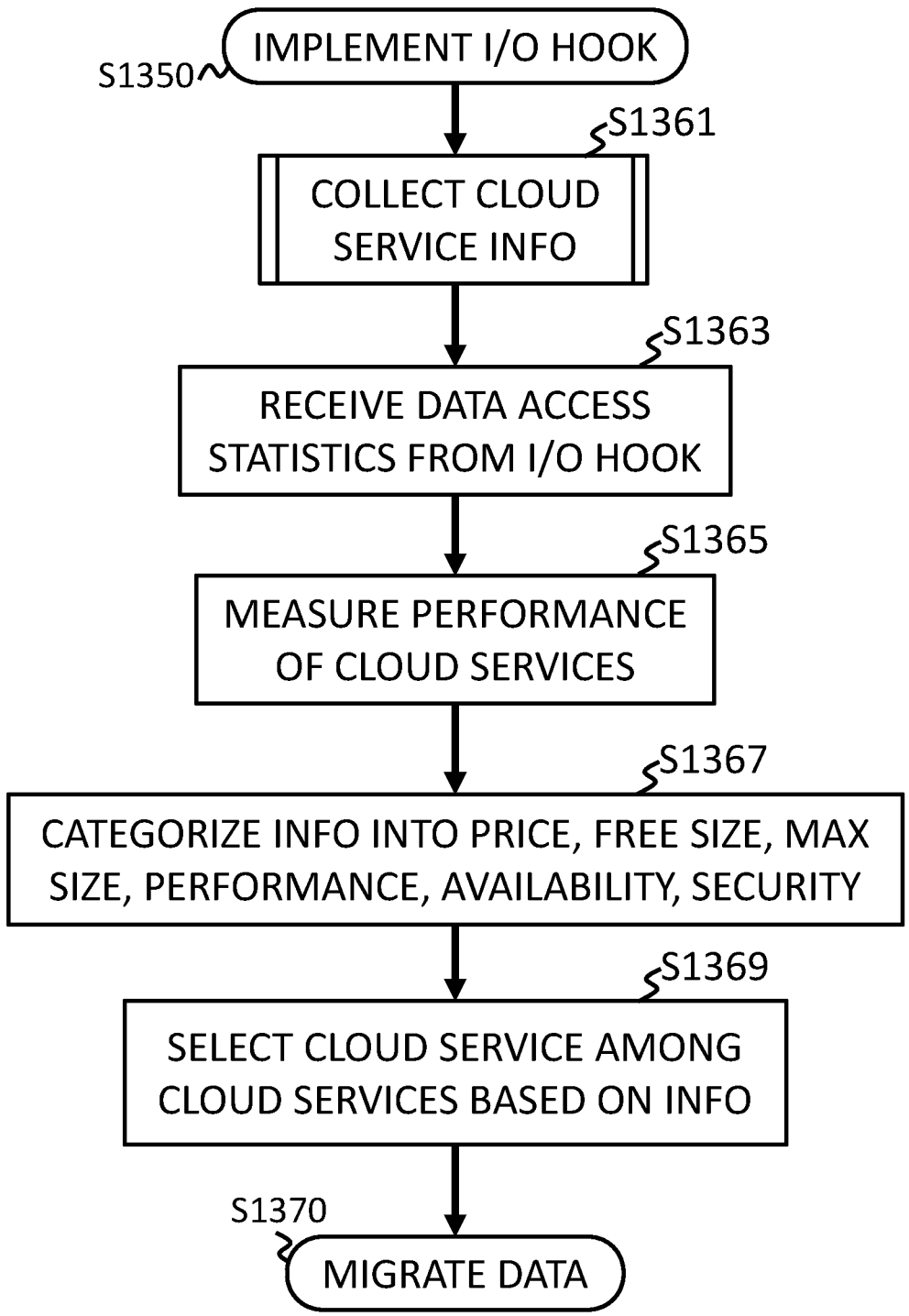
FIG. 13 shows one embodiment of an example operational flow of cloud service selection.

FIG. 13 shows an operational flow of cloud service selection, such as cloud service selection S860. The operations S1361-S1369 may be performed by a cloud service selecting section, such as cloud service selecting section 118. Once an I/O hook, such as I/O hook 122 has been implemented at S1350, the cloud service selecting section may collect cloud service information. There are a plurality of methods of collecting cloud service information. Cloud service information can be automatically collected, for example, by using a web service. Cloud service information can also be manually input. Cloud service information can be collected from a cloud information agent, such as cloud information agent 639. At S1363, the cloud service selecting section may receive data access statistics from the I/O hook. More specifically, the cloud service selecting section may read collected information and the statistical analysis thereof from a storage medium of statistical information, such as storage medium 128A. In other words, the collecting may include collecting at least part of the information from a third party server that obtains the part of the information from at least one of the cloud services among a plurality of cloud services. At S1365, the cloud service selecting section may measure performance characteristics of different cloud services. In other words, the collecting may include collecting at least part of the information by measuring performance of at least one of the plurality of cloud services. At S1367, the cloud service selecting section may categorize the performance characteristics into categories that may include price, free size, maximum size, performance, availability, security, etc. At S1369, the cloud service selecting section may select a cloud service from among the plurality of cloud services for which information was collected for data storage according to cloud service information and performance characteristics. In other words, the selecting may be further based on at least one of a price, a free storage size, a maximum storage size, a performance, an availability, and/or a security of each cloud storage service. As an example, the cloud service selecting section may select one or more cloud services that satisfies essential requirements for one or more files, or all files accessed by the application. The essential requirements are requirements that must be satisfied. For example, if an availability requirement and/or security requirement is specified for the one or more files, then the cloud service selecting section will not select a cloud service that does not satisfy this requirement. The cloud service selecting section will also not select a cloud service that has a smaller maximum storage size than a required storage size. Then, the cloud service selecting section may compare cloud services that satisfy the essential requirements, and select a best or better cloud service among them. If two or more cloud services have the same performance characteristics except for one performance characnteristic corresponding to one metric, then the cloud service selecting section may select the cloud service that has the best performance characteristic corresponding to the metric. For example, if two cloud services have the same performance characteristics except for the price of storing data, then the cloud service which has the lower price may be selected. If two cloud services have different performance characteristics for two or more metrics, then the cloud service selecting section may select a cloud service based on a policy such as "Price priority," "Speed priority," or any other policy of the I/O agent. If two or more cloud services are comparable under the current condition, then the cloud service selecting section may select a cloud service in anticipation of an expected future condition. For example, the cloud service selecting section may select a cloud service having a smaller increase in price for an increase of data size than that of other cloud services.

In some embodiments information may be collected and analyzed for migrating data, at S1370, into a cloud storage environment. Selection of an optimum cloud service may be performed for each file periodically by the cloud selecting section. File I/O processing information by collected and analyzed periodically by the I/O agent and the I/O hook.

Figure 14:
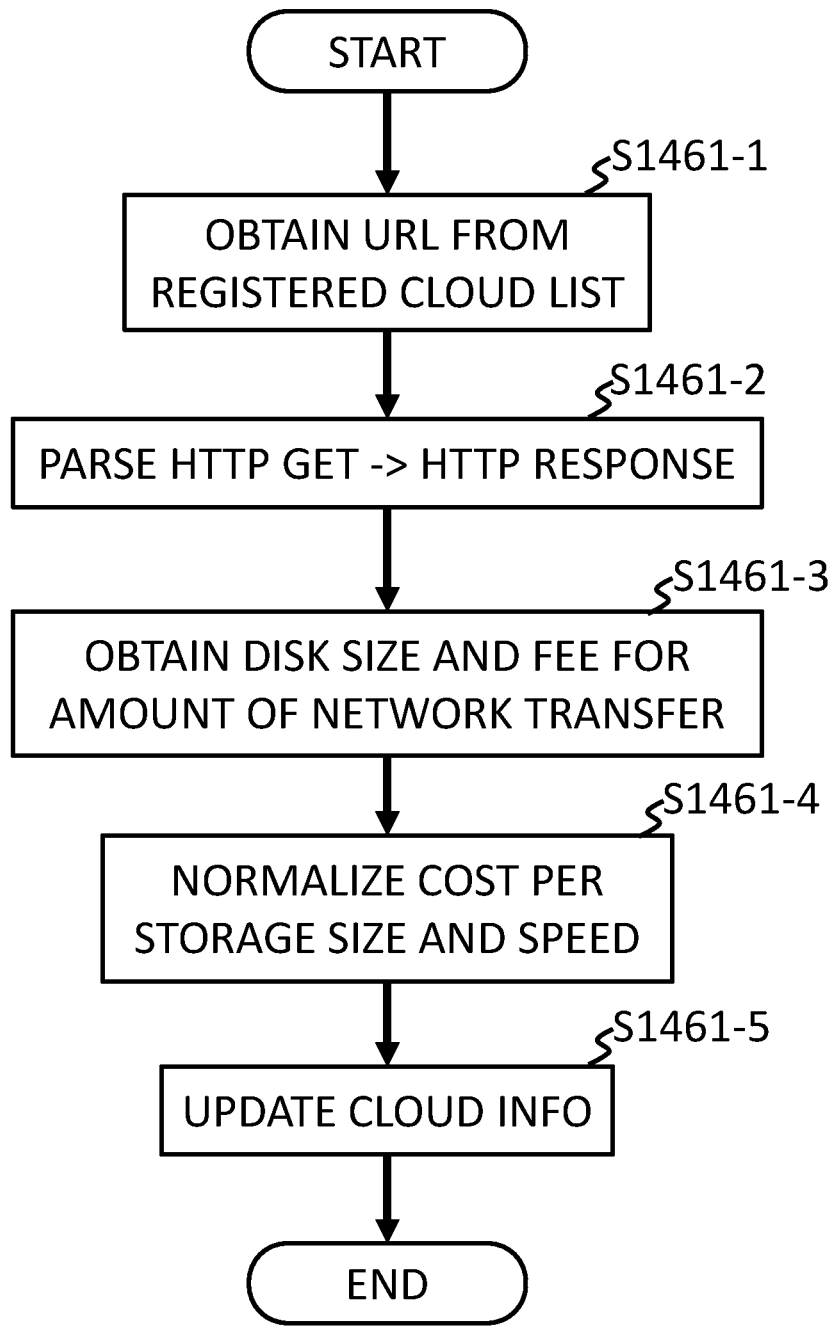
FIG. 14 shows one embodiment of an example operational flow of cloud service information collection.

FIG. 14 shows an operational flow of cloud service information collection, such as cloud information collection S1361. The operations S1461-1-S1461-5 may be performed by a cloud service selecting section, such as cloud service selecting section 118. At S1461-1, the cloud service selecting section may obtain a Uniform Resource Locator (URL) from a registered list of cloud services. At S1461-2, the cloud service selecting section may parse an "HTTP GET" in order to receive an "HTTP RESPONSE" from a cloud information agent, such as cloud information agent 639. At S1461-3, the cloud selecting section may obtain cloud service information, such as disk size and a fee per amount of data transfer from the cloud information agent. At S1461-4, the cloud service information received from the cloud information agent is normalized. More specifically, the cost is set to a constant across all cloud services, such as $1, and the storage size and speed of each service are provided in terms of how much of each is available for that cost. At S1461-5, the cloud service information, such as cloud service information stored in storage medium 128B, is updated with the normalized cloud service information.

In some embodiments, the cloud information agent may collect pieces of cloud environment information, and adds the pieces of information to a table, such as TABLE 2.

In such embodiments, the cloud information agent may select an optimum cloud service according to a request from an I/O agent. For example, to transfer a file of 128 kB or less at a rate of 3 MB/s or higher, a cloud service such as BBB2 would be applicable. For another example, to transfer a file of 10 MB or less at a rate of 50 MB/s or higher, a cloud service such as AAA (OS) would be applicable.

In some embodiments, an I/O agent may obtain the latest information from a cloud information agent, make comparisons between the latest information and the cloud service presently used, determine whether or not it is more advantageous to change the cloud service in use, and notify the user of the determination result.

Figure 15:
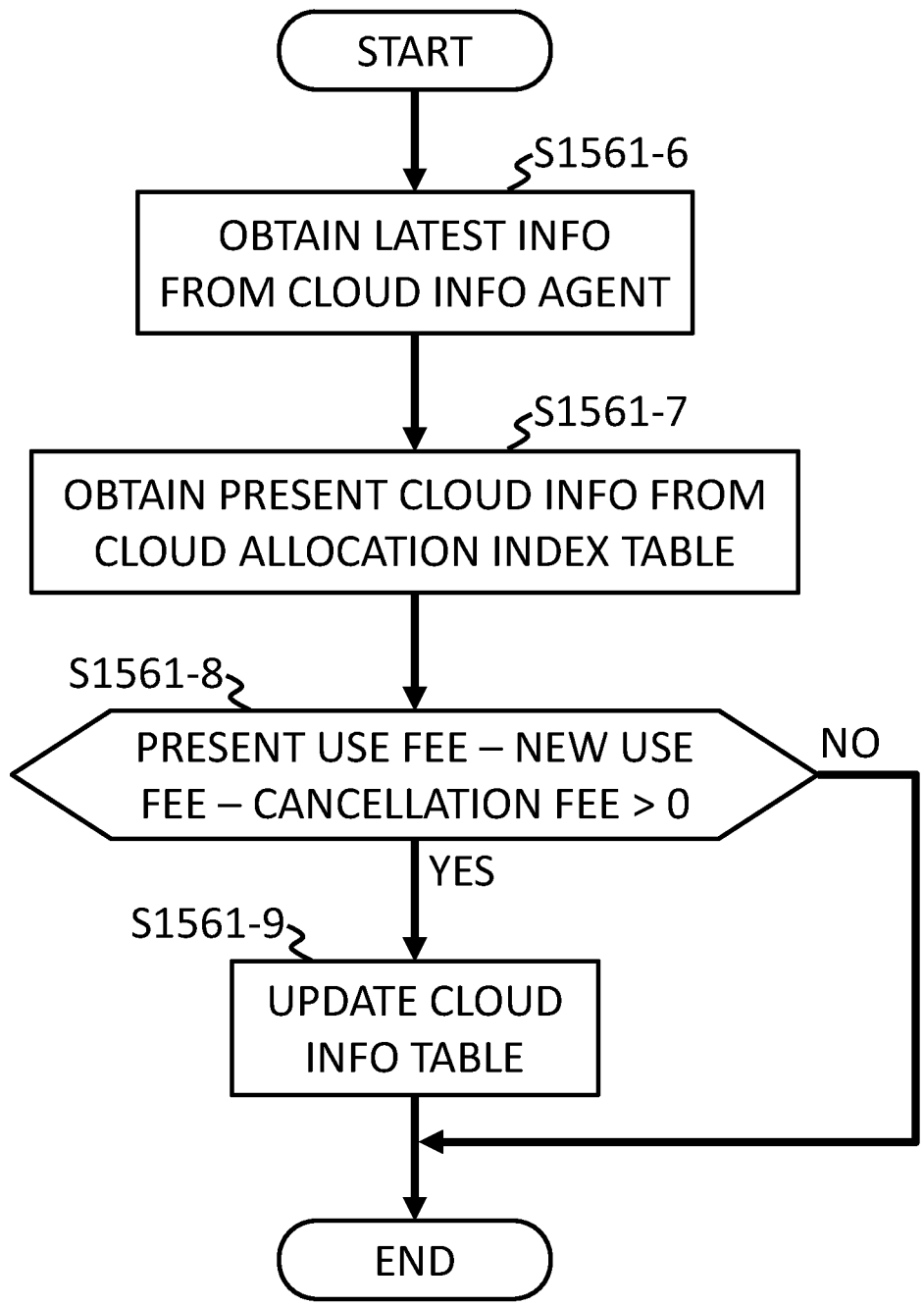
FIG. 15 shows one embodiment of an example operational flow of cloud service changing.

FIG. 15 shows an operational flow of cloud service changing. The operations S1561-6-S1561-9 may be performed by a cloud service selecting section, such as cloud service selecting section 118. At S1561-6, the cloud service selecting section may obtain the latest information from a cloud information agent, such as cloud information agent 639. At S1561-7, the cloud service selecting section may obtain information about the cloud service presently used from a cloud allocation index table. At S1561-8, the cloud service collecting section compares the presently used cloud service fee with a sum of the lowest fee from an applicable cloud service according to the latest information plus any necessary cancellation fee that would accompany a hypothetical change of cloud services. If the presently used cloud service fee is greater than the sum, then the cloud allocation index table is updated to reflect a change of cloud service to the new cloud service at S1561-9. If the presently used cloud service fee is not greater than the sum at S1561-8, then the process may be ended. Under either determination at S1561-8, a user may be notified of the determination.

Figure 16:
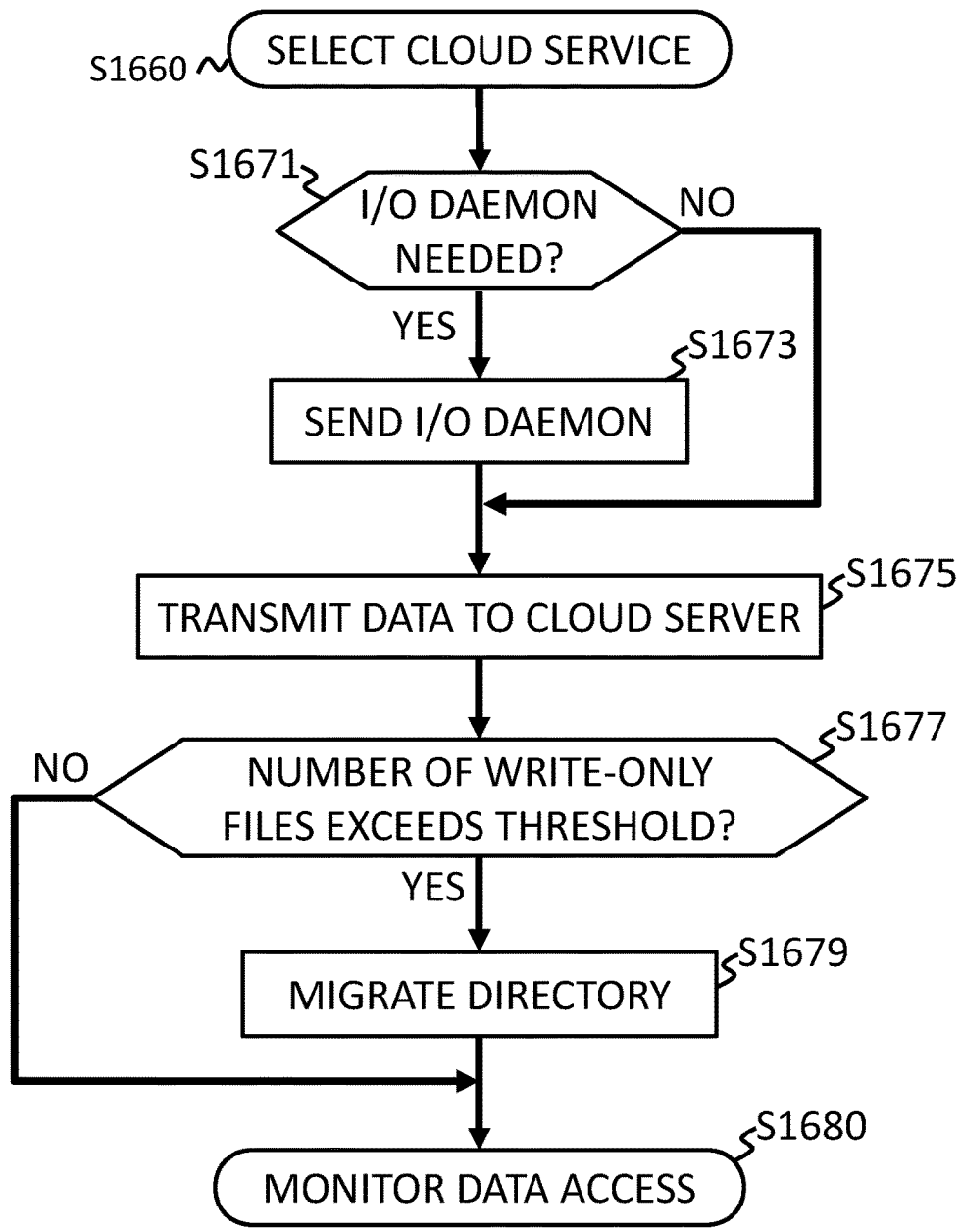
FIG. 16 shows one embodiment of an example operational flow of data migration.

FIG. 16 shows an operational flow of data migration, such as data migration S870. The operations S1671-S1679 may be performed by an I/O agent, such as I/O agent 110. Once a cloud service has been selected, at S1671, an I/O daemon sending section, such as I/O daemon sending section 116, may determine whether the cloud server needs an I/O daemon, such as when the cloud server performs OS level cloud storage services. If the I/O daemon sending section determines that an I/O daemon is needed, then the I/O daemon sending section sends an I/O daemon to the cloud server at S1673. In other words, the migrating may include sending an I/O daemon to the cloud server, the I/O daemon including instructions that, when executed by the cloud server, cause the cloud server to provide data access on the cloud server. If the I/O daemon sending section determines that an I/O daemon is not needed at S1671, then the operational flow proceeds to S1675. At S1675, a data migrating section, such as data migrating section 114, transmits data to the cloud server. In other words, the migrating may include transmitting the data accessed by an application, such as application 120, from a local storage, such as storage medium 128C, to the cloud server. At S1677, the

TABLE 2

| Cloud service | Type | 1 KB (MB/s) | 128 KB (MB/s) | 1 MB (MB/s) | 10 MB (MB/s) | 30-day availability (%) | Free storage (GB) | Price ($/GB) |
| --- | --- | --- | --- | --- | --- | --- | --- | --- |
| AAA | Storage | 2.1 | 4.2 | 15.2 | 27.3 | 99.98 | 2.0 | 12.0 |
| AAA | OS | 3.5 | 10.2 | 30.1 | 57.6 | 100 | — | 35.0 |
| BBB1 | Storage | 1.6 | 2.4 | 9.8 | 15.1 | 99.95 | 1.0 | 8.0 |
| BBB2 | Storage | 2.0 | 3.5 | 12.1 | 20.4 | 99.95 | 1.0 | 10.0 |
| CCC | Storage | 3.1 | 7.6 | 21.4 | 40.5 | 99.99 | 1.0 | 20.0 |
| CCC | OS | 5.5 | 10.3 | 45.7 | 87.4 | 100 | — | 45.0 |
| ... | ... | ... | ... | ... | ... | ... | ... | ... | data migration section may determine whether a number of write-only files in a certain directory exceeds a threshold number. If the number exceeds the threshold, then the data migrating section transmits the entire directory to the cloud server at S1679. In other words, the migrating includes determining whether a number of write-only files in a directory exceeds a threshold and transferring the directory to the cloud server in response to the determination that the number of write-only files in the directory exceeds the threshold. Once the directory has been transmitted, or in the event that the number of write-only files in the directory does not exceed the threshold number at S1677, the operational flow may proceed to S1680, where data access is monitored.

Figure 17:
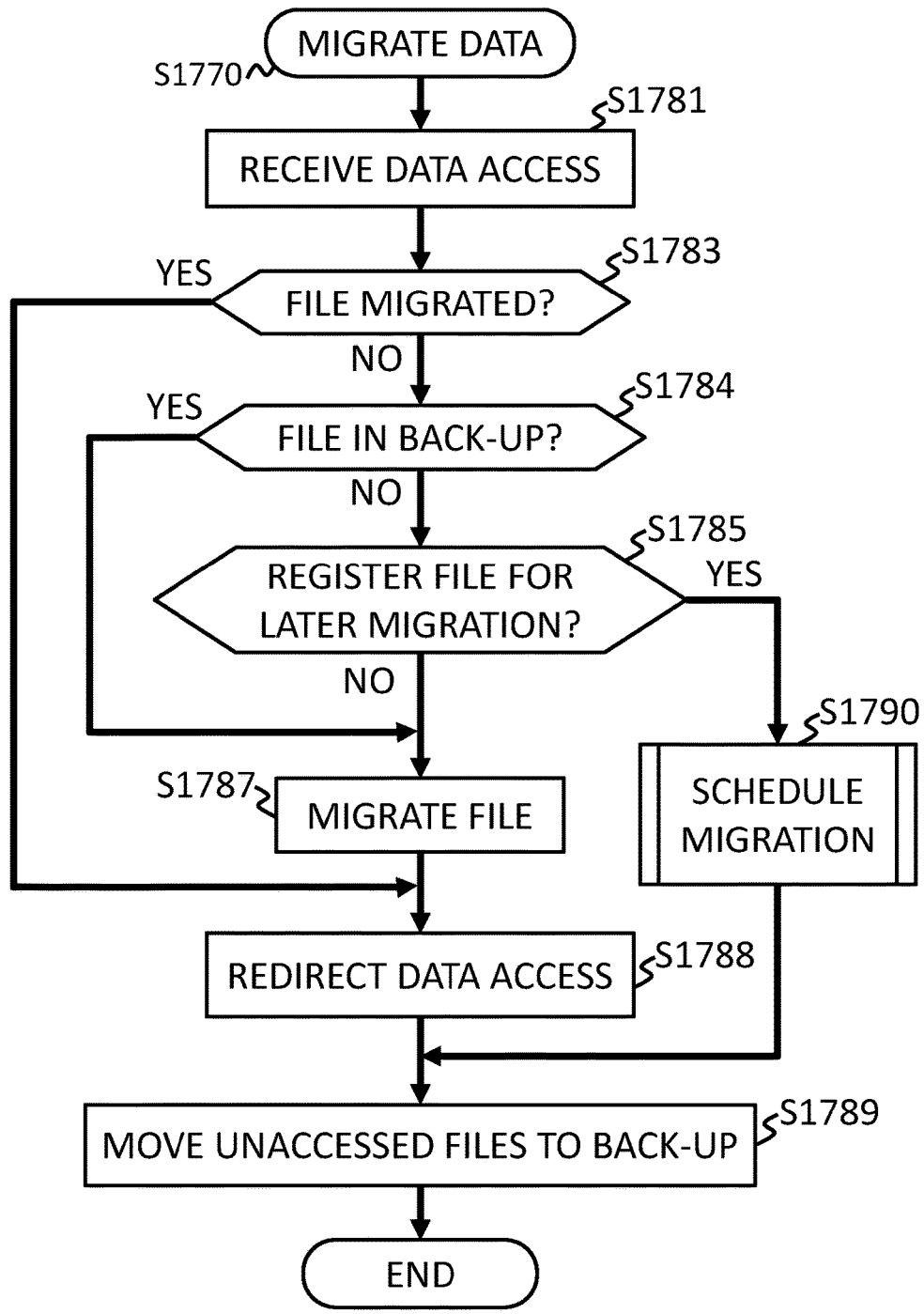
FIG. 17 shows one embodiment of an example an operational flow of data access monitoring.

FIG. 17 shows an operational flow of data access monitoring, such as data access monitoring S880. The operations S1781-S1790 may be performed by a data migrating section, such as data migrating section 114, of an I/O agent, such as I/O agent 110. Once initial data has been migrated at S1770, at S1781, a data access redirecting section, such as data access redirecting section 112, may receive notification of a data access request of an application, such as application 120, from a data access intercepting section, such as data access request intercepting section 124. In other words, the data access requesting section may receive, from the I/O hook, a data access intercepted from the application. At S1783, the data access redirecting section determines whether a data file that is the subject of the data access request has been migrated. If the data file has not been migrated, then then operational flow proceeds to S1784, where the data access redirecting section determines whether the data file is stored in a backup storage. If the data file has not been stored in backup storage, then the operational flow proceeds to S1785, where a data migrating section, such as data migrating section 114, determines whether to transmit the data file immediately (synchronously) or to register the data file for later transmission (asynchronously). If the data migrating section determines not to transmit the data file immediately, then the data migrating section may schedule migration of the data file for a later time at S1790. In other words, the data migrating section may register at least one file that has not been migrated to the cloud server in response to receiving a data access to the at least one file, and transferring the at least one registered file to the cloud server asynchronously. If the data migrating section determines to send the data file immediately, or in the event that the data file is stored in backup storage at S1784, then the data migrating section migrates the data file, at S1787, to a cloud server from either local storage or backup storage, depending on the current location of the data file. In other words, the data migrating section may migrate the file from the back-up storage to the cloud server in response to receiving a data access to the file in the back-up storage. Once the file has been migrated at S1787, or in the event that the data access redirecting section determined that the file had already been migrated at S1783, the data access redirecting section redirects access to the data file, at S1788, to the location of the data file on the cloud server. In other words, the data access redirecting section may redirect the intercepted data access to the cloud server. Once data access has been redirected, or in the event that the data migration section schedules migration of the data file at a later time, the operational flow proceeds to S1789, where the data migrating section may move one or more unaccessed file to a backup storage. In other words, the data migrating section may monitor a frequency of data access of the application to a file which has not been migrated to the cloud server, and moving the file from a local storage to a back-up storage in response to the frequency falling below a threshold. Once the data files, if any, are moved onto a backup storage, then the operational flow may end. With this operational flow, it is possible to migrate each file that has not been migrated to the cloud server in response to receiving a data access to the file.

In some embodiments, the I/O agent may determine a cloud service as a replication destination according to a request from the I/O hook, and make a request to the I/O daemon for replication. In the case of a synchronous type, replication is immediately executed. In the case of an asynchronous type, an event is added to a replication event queue.

Figure 18:
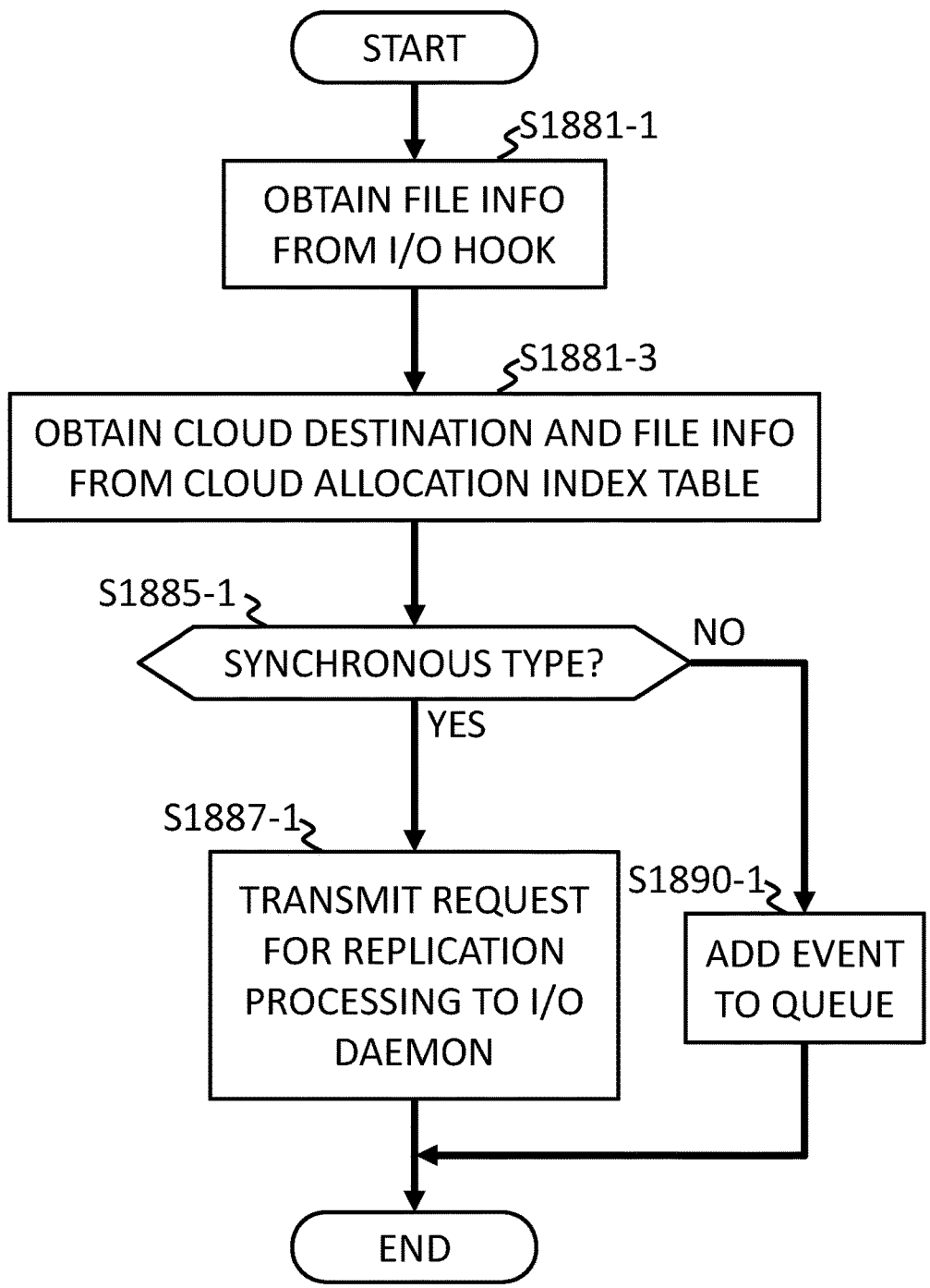
FIG. 18 shows one embodiment of an example operational flow of data file replication.

FIG. 18 shows an operational flow of data file replication. The operations S1881-1-S1890-1 may be performed by a data access redirecting section, such as data access redirecting section 112, of an I/O agent, such as I/O agent 110. At S1881-1, the I/O agent may obtain file information from an I/O hook, such as I/O hook 122. At S1881-3, the I/O agent may obtain cloud service information and file information from a cloud allocation index table. At S1885-1, the I/O agent may determine whether or not to employ a synchronous type of replication. In other words, the I/O agent may determine whether or not to send the data immediately. If the I/O agent determines to employ a synchronous type of replication, then the I/O agent may transmit a request for replication processing to an I/O daemon, such as I/O daemon 636B, at S1887-1. If the I/O agent determines not to employ a synchronous type of replication, then the I/O agent may add the transmission event to a queue at S1890-1. Once the I/O agent transmits the replication request or adds the transmission even to the queue, the operational flow may end.

In some embodiments, the I/O agent may determine a cloud service as a target according to a request from the I/O hook, make a request to the I/O daemon for I/O processing, and return the result to the I/O hook.

Figure 19:
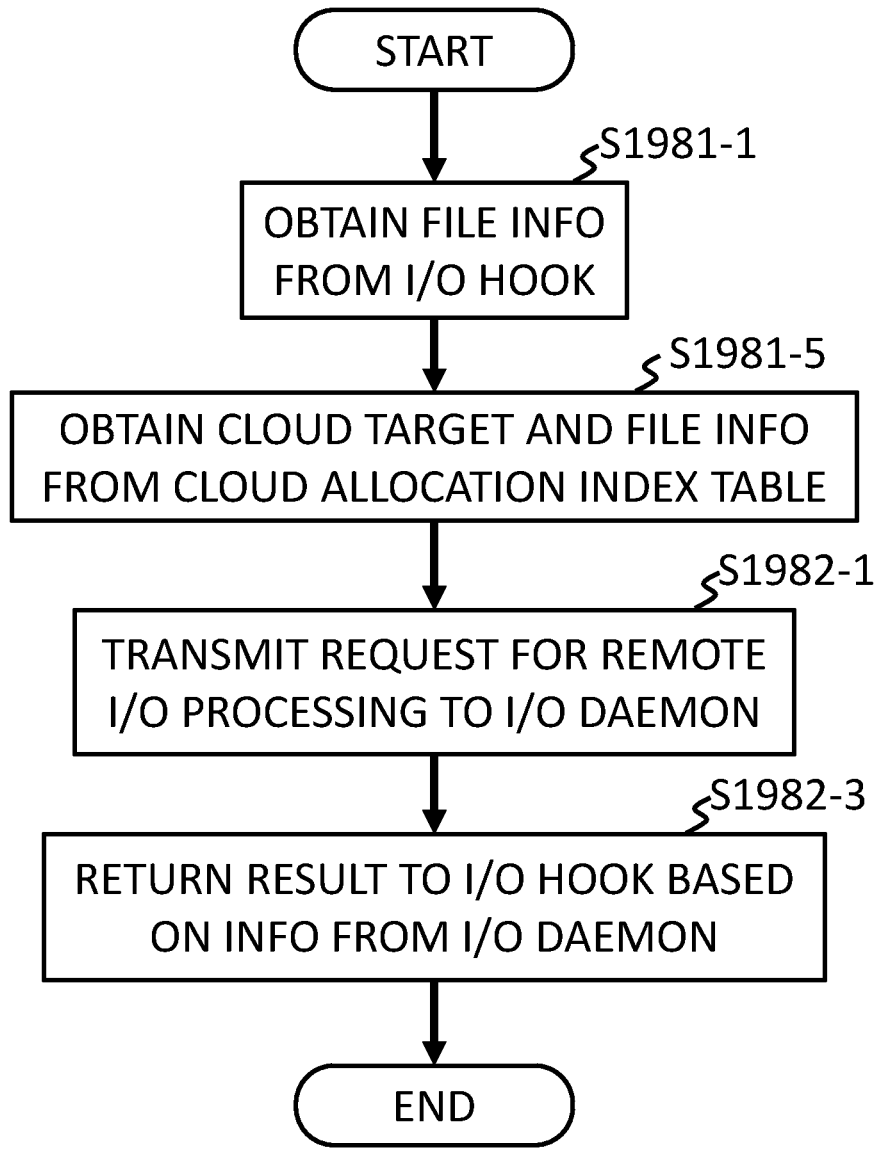
FIG. 19 shows one embodiment of an example operational flow of remote I/O processing.

FIG. 19 shows an operational flow of remote I/O processing. The operations S1981-1-S1982-3 may be performed by a data access redirecting section, such as data access redirecting section 112, of an I/O agent, such as I/O agent 110. At S1981-1, the I/O agent may obtain file information from an I/O hook, such as I/O hook 122. At S1981-5, the I/O agent may obtain target cloud service information and file information from a cloud allocation index table. At S1982-1, the I/O agent may transmit a request for remote I/O processing to an I/O daemon, such as I/O daemon 636B. At S1982-3, the I/O agent may return a result of the I/O processing request from the I/O daemon to the I/O hook. This result may be read data from the data file, a confirmation of written data to the data file, etc.

In some embodiments, the I/O daemon may execute replication of files according to a request from the I/O agent.

Figure 20:
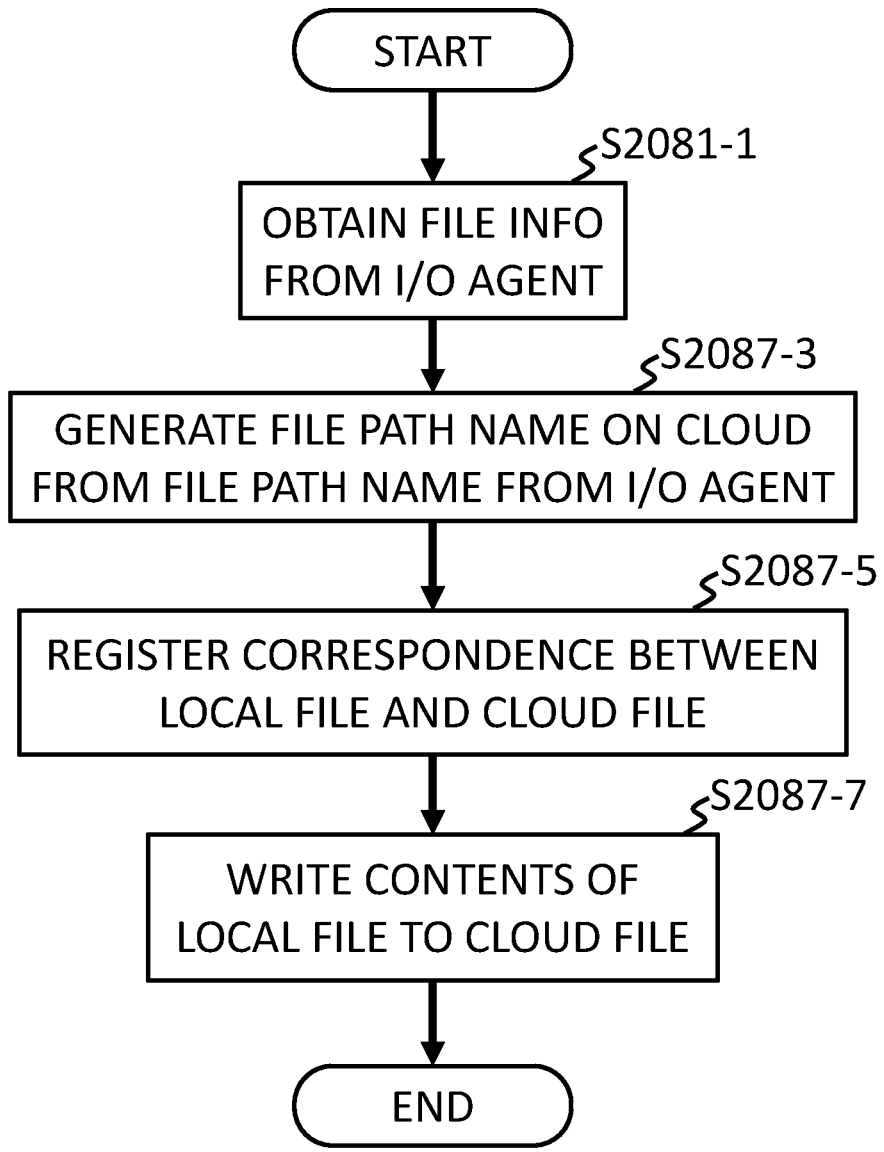
FIG. 20 shows one embodiment of an example operational flow of data file replication.

FIG. 20 shows an operational flow of data file replication. The operations S2081-1-S2087-7 may be performed by an I/O daemon, such as I/O daemon 636B. At S2081-1, the I/O daemon may obtain file information from an I/O agent, such as I/O agent 110. At S2087-3, the I/O daemon may generate a file path name on the cloud server from a file path name provided within the file information received from the I/O agent. At S2087-5, the I/O daemon may register correspondence between the local file and the file stored on the cloud server in a correspondence table, so that the location of the file stored on the cloud may be accessed when an application requests I/O processing on the file in the future. At S2087-7, the I/O daemon may write the contents of the local file to the registered location on the cloud server.

In some embodiments, the I/O daemon may execute file I/O processing according to a request from the I/O agent, and return the result to the I/O agent.

Figure 21:
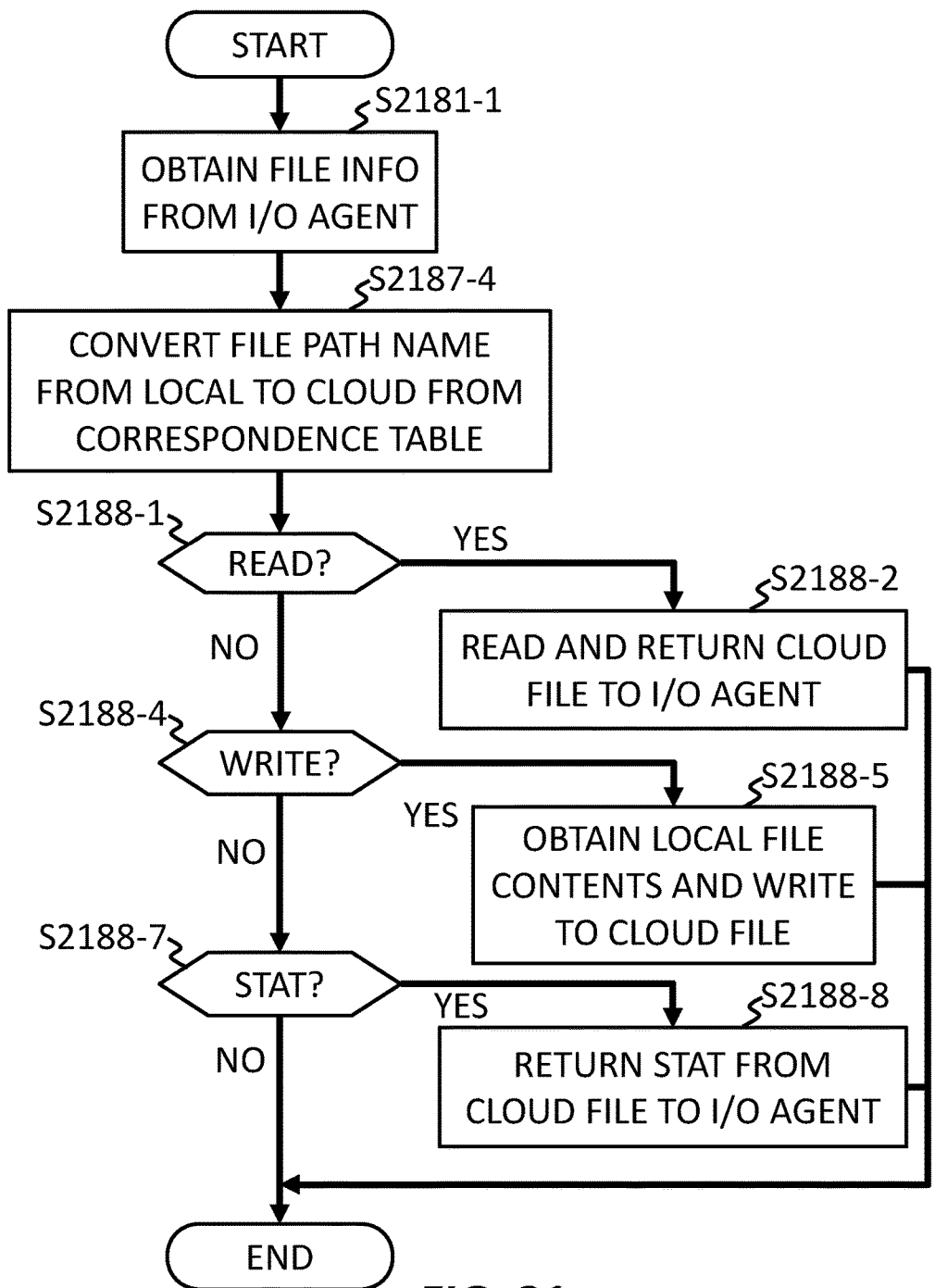
FIG. 21 shows one embodiment of an example operational flow of remote I/O processing.

FIG. 21 shows an operational flow of remote I/O processing. The operations S2181-1-S2188-8 may be performed by an I/O daemon, such as I/O daemon 636B. At S2181-1, the I/O daemon may obtain file information from an I/O agent, such as I/O agent 110. At S2187-4, the I/O daemon may convert a file path name from a file path name provided within the file information received from the I/O agent to the file path name provided on a cloud server from a correspondence table. At S2188-1, the I/O daemon may determine whether the operation according to the I/O processing request from the I/O agent is to read the file. If the I/O daemon determines that the I/O processing request is to read the file, then the I/O daemon may read and return the file stored on the cloud server to the I/O agent at S2188-2. If the I/O daemon determines that the I/O processing request is not to read the file at S2188-1, then the I/O daemon may determine whether the operation according to the I/O processing request from the I/O agent is to write to the file at S2188-4. If the I/O daemon determines that the I/O processing request is to write to the file, then the I/O daemon may read the local file contents and write to the file stored on the cloud server at S2188-5. If the I/O daemon determines that the I/O processing request is not to write to the file at S2188-4, then the I/O daemon may determine whether the operation according to the I/O processing request from the I/O agent is to obtain a statistic of the file at S2188-7. If the I/O daemon determines that the I/O processing request is to obtain a statistic of the file, then the I/O daemon may return the statistic of the file stored on the cloud server to the I/O agent at S2188-8. If the I/O daemon determines that the I/O processing request is not to obtain a statistic of the file at S2188-7, or in the event that the I/O daemon has responded to the I/O processing request at S2188-2, S2188-5, or S2188-8, then the operational flow may end.

Figure 22:
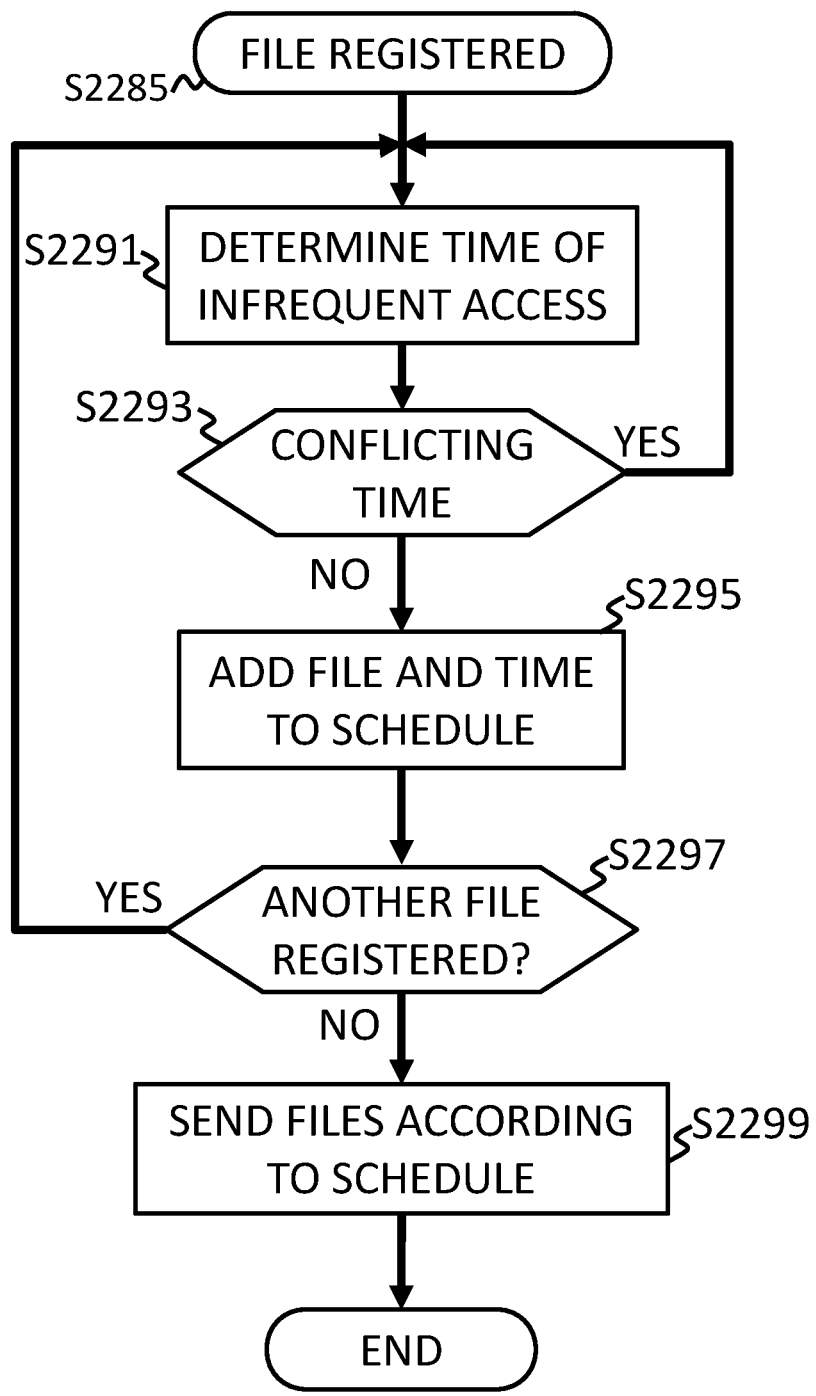
FIG. 22 shows one embodiment of an example operational flow of migration scheduling.

FIG. 22 shows an operational flow of migration scheduling, such as migration scheduling S1790. The operations S2291-S2299 may be performed by a data migrating section, such as data migrating section 114. Once a file has been registered for migration at S2285, at S2291, the data migrating section may determine a time of infrequent access to the file. A time of infrequent access may be a time of day, etc. The data migrating section may determine such a time of infrequent access by analyzing the data from statistics information received from an I/O hook, such as I/O hook 122, such as the statistics information stored in storage medium 128A. This time may become the time that the file is scheduled to be migrated to the cloud server. In other words, the transferring includes determining a schedule to transfer the at least one registered file based on data access statistics of the application from the I/O hook. At S2293, the data migrating section may determine if the time of infrequent access conflicts with the time that another file is already determined to be migrated to the cloud server. If the data migrating section determines that the determined time does conflict with another file's migration time, then the operational flow returns to S2291, where another time of infrequent access is determined. If the data migrating section determines that the determined time does not conflict with any other file's migration time, then the data migrating section adds the file and time to the migration schedule at S2295. At S2297, the data migrating section may determine whether another file has been registered for migration before the time for migrating files has arrived. If the data migrating section determines that another file has been registered for migration, then the operational flow returns to S2291. If the data migrating section determines that no other files have been registered for migration before the time for migrating files according to the migration schedule arrives, then the data migrating section sends the file(s) according to the migration schedule at S2299.

FIG. 23 shows an example user interface for monitoring the status of utilization of cloud services. Display 2300-18 may provide an output from an apparatus, such as apparatus 100. Display 2300-18 may produce an image from a signal received from the apparatus, such as a computer monitor, television, touch screen, etc. A touch screen may convert manual presence or motion into electrical signals. The electrical signals may be received by the apparatus and interpreted as commands In this manner, display 2300-18 may also provide an input to the apparatus. A user viewing the user interface on display 2300-18 may perceive and manipulate the current state of cloud service utilization. A user may determine which programs, such as an I/O agent, a cloud information agent, an I/O hook, an I/O daemon, etc., are being executed on the apparatus. The user may start, stop, and/or restart any of these programs through the user interface. The user may also monitor, start, stop, and/or restart any processes, such as an I/O information collection process, a replication process, and/or a remote I/O process. From this monitoring screen, the user may navigate to a cloud environment constitution screen, a file allocation screen, or a cloud update screen.

FIG. 24 shows an example user interface for monitoring a cloud environment constitution. The descriptions of the structures and functions of display 2300-18, as described above, may be applicable to display 2400-18. The cloud environment constitution screen may show the user a plurality of available cloud services in a form similar to TABLE 2, described above. In the cloud environment constitution screen, the user may add or remove cloud services manually, set a selection policy between price priority and speed priority, narrow the displayed cloud services to a certain type, such as storage-type or OS-type, usability percentage, etc., and input the fee value from which the cost of each cloud service is normalized.

FIG. 25 shows an example user interface for monitoring a file allocation table. The descriptions of the structures and functions of display 2300-18, as described above, may be applicable to display 2500-18. The file allocation table shows the user each data file used by an application, and allows the user to manually add data files for migration, change the cloud service of a data file, remove a data file from migration, or input a rule file, such as a rule file for migrating an entire directory of data files.

FIG. 26 shows an example user interface for monitoring presently used cloud services. The descriptions of the structures and functions of display 2300-18, as described above, may be applicable to display 2600-18. The presently used cloud services screen may show the user a list of cloud services that currently store data files accessed by applications, and statistics thereof, such as amount of space used, a number of files stored, an annual use fee, and a recommended different cloud service. While the presently used cloud services screen may not always show a recommended cloud service, if a recommend cloud service does appear, it may indicated to the user that the recommended cloud service is cheaper than the currently used cloud service even when considering a cancellation fee of the currently used cloud service. From the presently used cloud services screen, the user may update the list of cloud servers, thus refreshing any recommendations to change cloud services.

Figure 27:
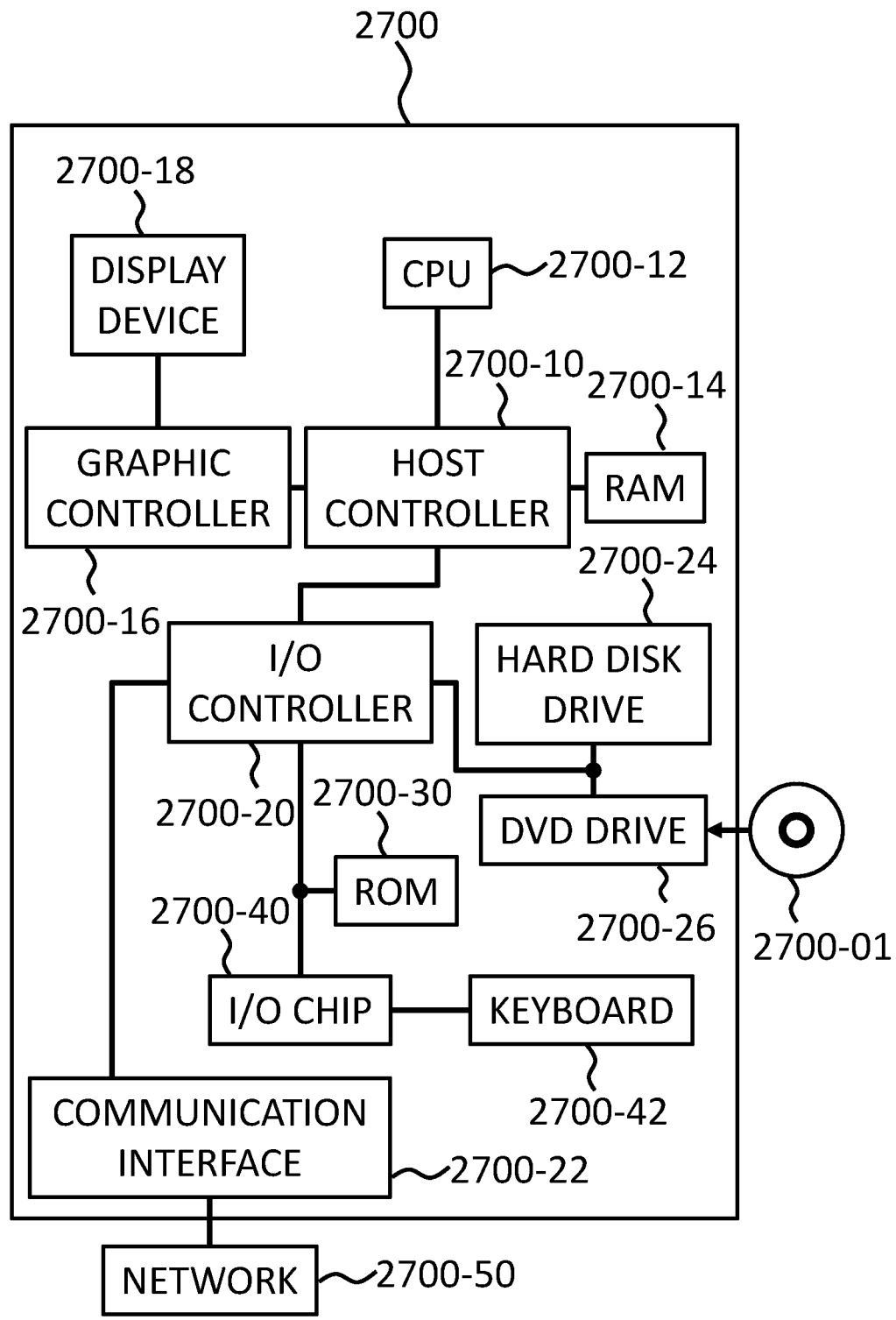
FIG. 27 shows one embodiment of an example exemplary hardware configuration of a computer configured for cloud service utilization.

FIG. 27 shows an exemplary hardware configuration of a computer configured for cloud service utilization. A program that is installed in the computer 2700 can cause the computer 2700 to function as or perform operations associated with apparatuses of the embodiments described herein or one or more sections (including modules, components, elements, etc.) thereof, and/or cause the computer 2700 to perform processes of the embodiments described herein or portions thereof. Such a program may be executed by the CPU 2700-12 to cause the computer 2700 to perform certain operations associated with some or all of the blocks of flowcharts and block diagrams described herein.

The computer 2700 according to the present embodiment includes a CPU 2700-12, a Random Access Memory (RAM) 2700-14, a graphics controller 2700-16, and a display device 2700-18, which are mutually connected by a host controller 2700-10. The computer 2700 also includes input/output units such as a communication interface 2700-22, a hard disk drive 2700-24, a DVD-ROM drive 2700-26 and an IC card drive, which are connected to the host controller 2700-10 via an input/output controller 2700-20. The computer also includes legacy input/output units such as a Read-Only Memory (ROM) 2700-30 and a keyboard 2700-42, which are connected to the input/output controller 2700-20 through an input/output chip 2700-40.

The CPU 2700-12 operates according to programs stored in the ROM 2700-30 and the RAM 2700-14, thereby controlling each unit. The graphics controller 2700-16 obtains image data generated by the CPU 2700-12 on a frame buffer or the like provided in the RAM 2700-14 or in itself, and causes the image data to be displayed on the display device 2700-18.

The communication interface 2700-22 communicates with other electronic devices via a network 2700-50. The hard disk drive 2700-24 stores programs and data used by the CPU 2700-12 within the computer 2700. The DVD-ROM drive 2700-26 reads the programs or the data from the DVD-ROM 2700-01, and provides the hard disk drive 2700-24 with the programs or the data via the RAM 2700-14. Additionally, an IC card drive reads programs and data from an IC card, and/or writes programs and data into the IC card.

The ROM 2700-30 stores therein a boot program or the like executed by the computer 2700 at the time of activation, and/or a program depending on the hardware of the computer 2700. The input/output chip 2700-40 may also connect various input/output units via a parallel port, a serial port, a keyboard port, a mouse port, and the like to the input/output controller 2700-20.

A program is provided by computer readable media such as the DVD-ROM 2700-01 or an IC card. The program is read from the computer readable media, installed into the hard disk drive 2700-24, RAM 2700-14, and/or ROM 2700-30, which are also examples of computer readable media, and executed by the CPU 2700-12. The information processing described in these programs is read into the computer 2700, resulting in cooperation between a program and the above-mentioned various types of hardware resources. An apparatus or method may be constituted by realizing the operation or processing of information in accordance with the usage of the computer 2700.

For example, when communication is performed between the computer 2700 and an external device, the CPU 2700-12 may execute a communication program loaded onto the RAM 2700-14 to instruct communication processing to the communication interface 2700-22, based on the processing described in the communication program. The communication interface 2700-22, under control of the CPU 2700-12, reads transmission data stored on a transmission buffering region provided in a recording medium such as the RAM 2700-14, the hard disk drive 2700-24, the DVD-ROM 2700-01, or the IC card, and transmits the read transmission data to network 2700-50 or writes reception data received from network 2700-50 to a reception buffering region or the like provided on the recording medium.

In addition, the CPU 2700-12 may cause all or a necessary portion of a file or a database to be read into the RAM 2700-14, the file or the database having been stored in an external recording medium such as the hard disk drive 2700-24, the DVD-ROM drive 2700-26 (DVD-ROM 2700-01), the IC card, etc., and perform various types of processing on the data on the RAM 2700-14. The CPU 2700-12 may then write back the processed data to the external recording medium.

Various types of information, such as various types of programs, data, tables, and databases, may be stored in the recording medium to undergo information processing. The CPU 2700-12 may perform various types of processing on the data read from the RAM 2700-14, which includes various types of operations, processing of information, condition judging, conditional branch, unconditional branch, search/replace of information, etc., as described throughout this disclosure and designated by an instruction sequence of programs, and writes the result back to the RAM 2700-14. In addition, the CPU 2700-12 may search for information in a file, a database, etc., in the recording medium. For example, when a plurality of entries, each having an attribute value of a first attribute is associated with an attribute value of a second attribute, are stored in the recording medium, the CPU 2700-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 2700. In addition, a recording medium such as a hard disk or a RAM provided in a server system connected to a dedicated communication network or the Internet can be used as the computer readable media, thereby providing the program to the computer 2700 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention can be used to realize cloud service utilization.

What is claimed is:

1. A computer program product comprising a computer readable storage medium having program instructions embodied therewith, the program instructions executable by a computer to cause the computer to perform operations comprising, for each of a plurality of applications:
- implementing a respective I/O hook configured to intercept a data access from a corresponding application of the plurality of applications;
- selecting a cloud service from a plurality of cloud services based on data access statistics generated by the respective I/O hook for the corresponding application;
- migrating data accessed by the corresponding application to a cloud server that provides the selected cloud service;
- receiving, from the respective I/O hook, a data access intercepted from the corresponding application; and
- redirecting the intercepted data access to the cloud server that provides the selected cloud service.

2. The computer program product of claim 1, wherein the migrating includes transmitting the data accessed by the corresponding application from a local storage to the cloud server.

3. The computer program product of claim 1, wherein the selecting includes collecting information relating to the plurality of storage services, and is further based on the information.

4. The computer program product of claim 3, wherein the collecting includes:
- collecting at least part of the information from a third party server that obtains the part of the information from at least one of the cloud services among the plurality of cloud services.

5. The computer program product of claim 3, wherein the selecting is further based on at least one of a price, a free storage size, a maximum storage size, a performance, an availability, or a security of each cloud storage service.

6. The computer program product of claim 1, further comprising migrating each file that has not been migrated to the cloud server in response to receiving a data access to the file.

7. The computer program product of claim 1, further comprising:
- registering at least one file that has not been migrated to the cloud server in response to receiving a data access to the at least one file, and
- transferring the at least one registered file to the cloud server asynchronously.

8. The computer program product of claim 1, wherein the migrating includes:
- determining whether a number of write-only files in a directory exceeds a threshold, and
- transferring the directory to the cloud server in response to the determination that the number of write-only files in the directory exceeds the threshold.

9. The computer program product of claim 1, further comprising:
- monitoring a frequency of data access of the corresponding application to a file which has not been migrated to the cloud server, and
- moving the file from a local storage to a back-up storage in response to the frequency falling below a threshold.

10. The computer program product of claim 1, wherein selecting the cloud service from the plurality of cloud services further comprises selecting a respective cloud service for each file of a plurality of files based on data access statistics corresponding to each file.

11. A computer comprising:
- a processor;
- one or more computer readable mediums collectively including instructions that, when executed by the processor, cause the processor to:
- for each of a plurality of applications:
- implement a respective I/O hook configured to intercept a data access from a corresponding application of the plurality of applications;
- select a cloud service from a plurality of cloud services based on data access statistics generated by the respective I/O hook for the corresponding application;
- migrate data accessed by the corresponding application to a cloud server that provides the selected cloud service;
- receive, from the respective I/O hook, a data access intercepted from the corresponding application; and
- redirect the intercepted data access to the cloud server that provides the selected cloud service.

12. The computer of claim 11, wherein the processor is configured to migrate the data by transmitting the data accessed by the corresponding application from a local storage to the cloud server.

13. The computer of claim 11, wherein the processor is configured to select the cloud service based on at least one of a price, a free storage size, a maximum storage size, a performance, an availability, or a security of each cloud storage service.

14. The computer of claim 11, wherein the processor is configured to migrate each file that has not been migrated to the cloud server in response to receiving a data access to the file.

15. The computer of claim 11, wherein the processor is configured to:
- register at least one file that has not been migrated to the cloud server in response to receiving a data access to the at least one file, and
- transfer the at least one registered file to the cloud server asynchronously.

16. The computer of claim 11, wherein the processor is configured to migrate the data accessed by the corresponding application to the cloud server that provides the selected cloud service by:
- determining whether a number of write-only files in a directory exceeds a threshold, and
- transferring the directory to the cloud server in response to the determination that the number of write-only files in the directory exceeds the threshold.

17. The computer of claim 11, wherein the processor is configured to:
- monitor a frequency of data access of the corresponding application to a file which has not been migrated to the cloud server, and
- move the file from a local storage to a back-up storage in response to the frequency falling below a threshold.

18. The computer of claim 11, wherein the processor is configured to select a respective cloud service for each file of a plurality of files based on data access statistics corresponding to each file.

* * * * *